(12) United States Patent
Gaffney et al.

(10) Patent No.: US 12,282,938 B2
(45) Date of Patent: Apr. 22, 2025

(54) METHODS AND APPARATUS FOR GENERATING INFORMATION ABOUT PORTABLE DEVICE ADVERTISING

(71) Applicant: The Nielsen Company (US), LLC, New York, NY (US)

(72) Inventors: Tamara Gaffney, Belmont, CA (US); Kanishka Agarwal, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/962,051

(22) Filed: Oct. 7, 2022

(65) Prior Publication Data
US 2023/0106415 A1    Apr. 6, 2023

Related U.S. Application Data

(63) Continuation of application No. 17/164,557, filed on Feb. 1, 2021, now Pat. No. 11,468,479, which is a
(Continued)

(51) Int. Cl.
| | |
|---|---|
| G06Q 30/02 | (2023.01) |
| G06F 9/455 | (2018.01) |
| G06Q 30/0251 | (2023.01) |

(52) U.S. Cl.
CPC ......... *G06Q 30/0269* (2013.01); *G06F 9/455* (2013.01); *G06Q 30/02* (2013.01)

(58) Field of Classification Search
CPC .............. G06Q 30/0269; G06Q 30/02; G06Q 30/0207–30/0277; G06F 9/455
See application file for complete search history.

(56) References Cited

U.S. PATENT DOCUMENTS

| | | | |
|---|---|---|---|
| 4,356,545 A | 10/1982 | West | |
| 4,473,824 A | 9/1984 | Claytor | |

(Continued)

FOREIGN PATENT DOCUMENTS

| | | |
|---|---|---|
| JP | H10124428 | 5/1998 |
| JP | H1139258 | 2/1999 |
| WO | 9859309 | 12/1998 |

OTHER PUBLICATIONS

A Definition of Simulation. Dictionary.com. Dictionary.com Unabridged. Random House, Inc. http://dictionary.reference.com/browse/simulation (accessed: Oct. 24, 2011), 3 pages.
(Continued)

*Primary Examiner* — Thuy N Nguyen

(57) ABSTRACT

Example methods, apparatus and articles of manufacture are disclosed herein to generate information about portable device advertising. An example apparatus includes memory and at least one processor to execute machine readable instructions to, in response to one or more commands from a simulation processor external to the at least one processor, access data via the Internet based on a usage profile, the usage profile representative of portable device usage by persons having similar usage characteristics, sample portions of the data to distinguish an advertisement from non-advertising content, determine an attribute of the advertisement; and transmit the attribute to the simulation processor.

21 Claims, 13 Drawing Sheets

Related U.S. Application Data continuation of application No. 16/215,134, filed on Dec. 10, 2018, now Pat. No. 10,909,578, which is a continuation of application No. 11/805,497, filed on May 22, 2007, now Pat. No. 10,169,781.

(60) Provisional application No. 60/905,678, filed on Mar. 7, 2007.

(56) References Cited

U.S. PATENT DOCUMENTS

| | | |
|---|---|---|
| 4,566,030 A | 1/1986 | Nickerson et al. |
| 4,658,290 A | 4/1987 | McKenna et al. |
| 4,677,466 A | 6/1987 | Lert, Jr. et al. |
| 4,977,594 A | 12/1990 | Shear |
| 5,140,419 A | 8/1992 | Galumbeck et al. |
| 5,214,792 A | 5/1993 | Alwadish |
| 5,220,522 A | 6/1993 | Wilson et al. |
| 5,223,827 A | 6/1993 | Bell et al. |
| 5,223,924 A | 6/1993 | Strubbe |
| 5,237,684 A | 8/1993 | Record et al. |
| 5,241,625 A | 8/1993 | Epard et al. |
| 5,245,429 A | 9/1993 | Virginio et al. |
| 5,276,458 A | 1/1994 | Sawdon |
| 5,283,639 A | 2/1994 | Esch et al. |
| 5,315,093 A | 5/1994 | Stewart |
| 5,321,838 A | 6/1994 | Hensley et al. |
| 5,333,302 A | 7/1994 | Hensley et al. |
| 5,347,632 A | 9/1994 | Filepp et al. |
| 5,349,662 A | 9/1994 | Johnson et al. |
| 5,355,484 A | 10/1994 | Record et al. |
| 5,359,367 A | 10/1994 | Stockill |
| 5,361,359 A | 11/1994 | Tajalli et al. |
| 5,374,951 A | 12/1994 | Welsh |
| 5,375,070 A | 12/1994 | Hershey et al. |
| 5,379,380 A | 1/1995 | Mori et al. |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,410,598 A | 4/1995 | Shear |
| 5,499,340 A | 3/1996 | Barritz |
| 5,675,510 A | 10/1997 | Coffey et al. |
| 5,696,702 A | 12/1997 | Skinner et al. |
| 5,708,709 A | 1/1998 | Rose |
| 5,708,780 A | 1/1998 | Levergood et al. |
| 5,712,979 A | 1/1998 | Graber et al. |
| 5,717,860 A | 2/1998 | Graber et al. |
| 5,717,923 A | 2/1998 | Dedrick |
| 5,724,521 A | 3/1998 | Dedrick |
| 5,732,218 A | 3/1998 | Bland et al. |
| 5,740,549 A | 4/1998 | Reilly et al. |
| 5,796,952 A | 8/1998 | Davis et al. |
| 5,799,292 A | 8/1998 | Hekmatpour |
| 5,819,156 A | 10/1998 | Belmont |
| 5,819,285 A | 10/1998 | Damico et al. |
| 5,823,879 A | 10/1998 | Goldberg et al. |
| 5,838,919 A | 11/1998 | Schwaller et al. |
| 5,848,396 A | 12/1998 | Gerace |
| 5,872,588 A | 2/1999 | Aras et al. |
| 5,878,384 A | 3/1999 | Johnson et al. |
| 5,933,811 A | 8/1999 | Angles et al. |
| 5,935,207 A | 8/1999 | Logue et al. |
| 5,948,061 A | 9/1999 | Merriman et al. |
| 5,951,643 A | 9/1999 | Shelton et al. |
| 5,958,010 A | 9/1999 | Agarwal et al. |
| 5,963,914 A | 10/1999 | Skinner et al. |
| 5,964,839 A | 10/1999 | Johnson et al. |
| 5,991,735 A | 11/1999 | Gerace |
| 5,995,943 A | 11/1999 | Bull et al. |
| 5,999,178 A | 12/1999 | Hwang et al. |
| 6,014,638 A | 1/2000 | Burge et al. |
| 6,018,619 A | 1/2000 | Allard et al. |
| 6,029,195 A | 2/2000 | Herz |
| 6,052,730 A | 4/2000 | Felciano et al. |
| 6,091,956 A | 7/2000 | Hollenberg |
| 6,108,637 A | 8/2000 | Blumenau |
| 6,112,240 A | 8/2000 | Pogue et al. |
| 6,167,358 A | 12/2000 | Othmer et al. |
| 6,264,560 B1 | 7/2001 | Goldberg et al. |
| 6,275,854 B1 | 8/2001 | Himmel et al. |
| 6,279,036 B1 | 8/2001 | Himmel et al. |
| 6,324,546 B1 | 11/2001 | Ka et al. |
| 6,353,929 B1 | 3/2002 | Houston |
| 6,393,479 B1 | 5/2002 | Glommen et al. |
| 6,418,470 B2 | 7/2002 | Blumenau |
| 6,434,532 B2 | 8/2002 | Goldband et al. |
| 6,449,604 B1 | 9/2002 | Hansen et al. |
| 6,467,089 B1 | 10/2002 | Aust et al. |
| 6,587,835 B1 | 7/2003 | Treyz et al. |
| 6,601,100 B2 | 7/2003 | Lee et al. |
| 6,606,605 B1 | 8/2003 | Kolls |
| 6,647,269 B2 | 11/2003 | Hendrey et al. |
| 6,662,227 B2 | 12/2003 | Boyd et al. |
| 6,712,702 B2 | 3/2004 | Goldberg et al. |
| 6,745,011 B1 | 6/2004 | Hendrickson et al. |
| 6,807,558 B1 | 10/2004 | Hassett et al. |
| 6,834,308 B1 | 12/2004 | Ikezoye et al. |
| 6,839,680 B1* | 1/2005 | Liu .................. G06Q 30/02 705/7.33 |
| 6,968,178 B2 | 11/2005 | Pradhan et al. |
| 7,047,176 B2 | 5/2006 | Klevans et al. |
| 7,049,176 B2* | 5/2006 | Oda .................. H01L 21/4857 439/876 |
| 7,069,238 B2 | 6/2006 | I'Anson et al. |
| 7,155,210 B2 | 12/2006 | Benson |
| 7,206,647 B2 | 4/2007 | Kumar |
| 7,702,317 B2 | 4/2010 | Montelius |
| 7,760,684 B2 | 7/2010 | Kadar et al. |
| 8,351,342 B2* | 1/2013 | Rajan .................. H04W 16/22 370/252 |
| 8,645,198 B1 | 2/2014 | Nayfeh et al. |
| 10,169,781 B1 | 1/2019 | Gaffney et al. |
| 2001/0011264 A1 | 8/2001 | Kawasaki |
| 2002/0040394 A1 | 4/2002 | Shapira |
| 2002/0040395 A1 | 4/2002 | Davis et al. |
| 2002/0078191 A1 | 6/2002 | Lorenz |
| 2002/0083043 A1 | 6/2002 | Hoshi et al. |
| 2002/0087403 A1* | 7/2002 | Meyers .................. H04N 21/235 705/14.69 |
| 2002/0099812 A1 | 7/2002 | Davis et al. |
| 2002/0099818 A1 | 7/2002 | Russell et al. |
| 2002/0103664 A1 | 8/2002 | Olsson et al. |
| 2002/0112048 A1 | 8/2002 | Gruyer et al. |
| 2002/0133393 A1 | 9/2002 | Tatsumi et al. |
| 2002/0144283 A1 | 10/2002 | Headings et al. |
| 2002/0161673 A1 | 10/2002 | Lee et al. |
| 2002/0174230 A1* | 11/2002 | Gudorf .................. G06F 16/9536 709/227 |
| 2002/0194062 A1 | 12/2002 | Linde |
| 2003/0046303 A1 | 3/2003 | Chen et al. |
| 2003/0046385 A1 | 3/2003 | Vincent |
| 2003/0054757 A1 | 3/2003 | Kolessar et al. |
| 2003/0074252 A1* | 4/2003 | Chandler-Pepelnjak ................ G06Q 30/02 705/14.53 |
| 2003/0101451 A1* | 5/2003 | Bentolila .................. G06Q 30/0251 725/35 |
| 2003/0115586 A1 | 6/2003 | Lejouan et al. |
| 2003/0154092 A1 | 8/2003 | Bouron et al. |
| 2003/0163563 A1 | 8/2003 | Bean |
| 2003/0177488 A1 | 9/2003 | Smith et al. |
| 2003/0187677 A1 | 10/2003 | Malireddy et al. |
| 2003/0231203 A1 | 12/2003 | Gallella |
| 2004/0205198 A1 | 10/2004 | Zellner et al. |
| 2004/0221033 A1 | 11/2004 | Davis et al. |
| 2004/0260470 A1 | 12/2004 | Rast |
| 2005/0114511 A1 | 5/2005 | Davis et al. |
| 2005/0149407 A1 | 7/2005 | Kamiwada et al. |
| 2005/0149968 A1* | 7/2005 | Konig .................. H04N 21/25891 348/E7.06 |
| 2005/0189414 A1 | 9/2005 | Fano et al. |
| 2005/0203798 A1 | 9/2005 | Jensen et al. |

(56) References Cited

U.S. PATENT DOCUMENTS

| | | | |
|---|---|---|---|
| 2005/0216509 A1 | 9/2005 | Kolessar et al. | |
| 2006/0004627 A1 | 1/2006 | Baluja | |
| 2006/0010029 A1* | 1/2006 | Gross | G06Q 30/02 705/7.29 |
| 2006/0041480 A1 | 2/2006 | Briggs | |
| 2006/0187358 A1* | 8/2006 | Lienhart | H04N 21/812 348/661 |
| 2006/0195859 A1* | 8/2006 | Konig | H04N 21/44016 382/199 |
| 2006/0259360 A1* | 11/2006 | Flinn | G06Q 30/0261 705/14.71 |
| 2006/0274659 A1* | 12/2006 | Ouderkirk | H04L 41/145 370/241 |
| 2007/0038516 A1* | 2/2007 | Apple | G06Q 30/02 705/14.42 |
| 2007/0288277 A1 | 12/2007 | Neuhauser et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0086356 A1 | 4/2008 | Glassman et al. | |
| 2008/0126420 A1 | 5/2008 | Wright et al. | |
| 2008/0140479 A1 | 6/2008 | Mello et al. | |
| 2008/0201733 A1 | 8/2008 | Ertugrul et al. | |
| 2009/0024546 A1* | 1/2009 | Ficcaglia | G06Q 30/02 706/46 |
| 2011/0307739 A1* | 12/2011 | El Mahdy | G06F 11/261 714/28 |
| 2014/0058826 A1 | 2/2014 | Ogawa | |
| 2017/0221092 A1* | 8/2017 | Toval | G06Q 50/184 |
| 2017/0316457 A1* | 11/2017 | Gralla | G06Q 30/0254 |
| 2021/0158400 A1 | 5/2021 | Gaffney et al. | |

OTHER PUBLICATIONS

"Management of Location Based Advertisement Services using Spatial Triggers in Cellular Networks", Irfan et al. International Journal of Computer Science and Information Security (IJCSIS), vol. 6, No. 1, (Year: 2009), 5 pages.

International Seaching Authority, "International Search Report," issued by the International Searching Authority in connection with related PCT application No. PCT/US2008/056040, dated Nov. 10, 2008, (2 pages).

International Seaching Authority, "Written Opinion of the International Searching Authority," issued by the International Searching Authority in connection with related PCT application No. PCT/US2008/056040, dated Nov. 10, 2008, (5 pages).

International Seaching Authority, "International Preliminary Report on Patentability," issued in connection with PCT application Serial No. PCT/US2008/056040, dated Nov. 17, 2009, (6 pages).

Feliciano et al., "Lamprey: Tracking Users on the World Wide Web," Section on Medical Informatics, Stanford University, 1996, 1 page.

"They Could Be Monitoring Your Every Web Move," GCN, Apr. 29, 1996, http:www.gcn.com, 3 pages.

Johnson et al., "Automatic Touring in a Hypertext System," Wayne State University, Computer Science Department, IEEE, 1993, 7 pages.

John E. Tolle, "Perfomance Measurement and Evaluation of Online Information Systems," Proceedings of the 1985 ACM Computer Science Conference, Mar. 12-14, 1985, 8 pages.

Hansen et al., "Automated System Monitoring and Notification with Swatch," Seventh System Administration Conference, LISA, Nov. 1-5, 1993, Monterey, CA, 9 pages.

Jon Finke, "Monitoring Usage of Workstation with a Relational Database," LISA, Sep. 19-23, 1994, San Diego, CA, 10 pages.

Catledge et al., "Characterizing Browsing Strategy in the World-Wide-Web," Computer Networks and ISDN Systems, Proceedings of the Third International World-Wide-Web Conference, Apr. 10-14, 1995, 10 pages.

Cooley et al., "Web Mining: Information and Pattern Discovery on the World Wide Web," Department of Computer Science, University of Minnesota, 1997, IEEE, 10 pages.

Leah Haran, "PC-Meter Tracks Computer Uses," Advertising Age, Oct. 2, 1995, 4 pages.

Matthew K. Franklin et al., "Auditable Metering with Lightweight Security" AT&T Labs-Research, Florhram Park, New Jersey, USA, May 4, 1998, 13 pages.

Cunha et al., "Characteristics of WWW Client-based Traces," Computer Science Department, Boston University, Jul. 18, 1995, 18 pages.

Saul Greenberg, "Using Unix: Collected Traces of 168 Users," Advanced Technologies, The Alberta Research Council, 1988, 14 pages.

Hilbert et al., "Agents for Collecting Application Usage Data Over the Internet, " Department of Information and Computer Science, University of California, Irvine, '98 Proceedings of the second international conference on Autonomous agents, 1998, 10 pages.

Louis Desjardins, "Activity Monitor 1.1 User's Guide," 1994, 5 pages.

Pitkow et al., "Results From the Third WWW User Survey," Graphics, Visualization Usability (GVU) Center, The World Wide Web Journal, vol. 1, No. 1, 1995, 11 pages.

Ariel Poler, "Improving WWW Marketing Through User Information and Non-Intrusive Communications," Proceedings of the Second WWW Conference, 1994, 4 pages.

Fuller et al., "Measuring User Motivation From Server Log Files," Usability Research, retrieved from http://www.microsoft.com/usability/webconf/fuller/fuller.htm, on Oct. 30, 2000, 15 pages.

The HomeNet Project, "HomeNet: A Field Trial of Residential Internet Services," Carnegie Mellon University, Pittsburgh, PA 15213, Apr. 1995, http://homenet.hcii.cs.cmu.edu/progress/report1.html, 14 pages.

Kraut et al., "HomeNet: A Field Trial of Residential Internet Services," retrieved from http://www.acm.org/sigchi/chi96/proceedings/papers/Kraut/rek_txt.htm, 1996, 20 pages.

Siochi et al., "Computer Analysis of User Interfaces Based on Repetition in Transcripts of User Sessions," ACM Transactions on Information Systems, vol. 9, No. 4, Oct. 1991, 27 pages.

Gary Perlman, "Asynchronous Design/Evaluation Methods for Hypertext Technology Development," Hypertext '89 Proceedings, Nov. 1989, 21 pages.

Bieber et al., "Backtracking in a Multiple-window Hypertext Environment," Institute for Integrated Systems Research, ECHT '94 proceedings, Sep. 1994, 9 pages.

McKenzie et al., "An Empirical Analysis of Web Page Revisitation," Proceedings of the 34th Annual Hawaii International Conference on System Sciences, Jan. 3-6, 2001, 10 pages.

Rick Knoblaugh, "IOMON—Protected mode I/O port monitor," Version 1.0, Programmers Journal, vol. 9, No. 5, 1991, 6 pages.

Michael A. Abrams, "A Tool to Aid in Model Development and Validation," ANSS '86 Proceedings of the 19th annual symposium on Simulation, NCR Corporation, 1986, 11 pages.

Lee et al., "Intelligent Agents for Matching Information Providers and Consumers on the World-Wide-Web," Department of Computer Science, The University of Hong Kong, Proceedings of the Thirtieth Annual Hawaii International Conference on System Sciences, 1997, 11 pages.

Jim Warren, Google Groups Search Results, Tracking Web Advertising "Audience Tracking System for Electronic Newspapers," Telegrafix Communications, Inc., May 3, 1995, 3 pages.

J.M. Ivier, "Advertising Models and Associated Software . . . ," Google Groups Search Result, May 15, 1996, 5 pages.

Google Groups Search Result, "Java Project," Jan. 18, 1997 [retrieved from http://groups.google.com/group/comp.lang.java.programmer1browse_thread1th- read/5430a3 . . . , Apr. 12, 2006], 3 pages.

Glenn Fleishman, "Web Log Analysis: Whos Doing What, When? Part 2," Web Developers Magazine, vol. 2, No. 2 May/Jun. 1996, 4 pages.

Sukaviriya et al., "A Second Generation User Interface Design Environment: The Model and the Runtime Architecture," GIT-GVU-

(56) References Cited

OTHER PUBLICATIONS 92-24, Sep. 1992, Graphics, Visualization & Usability Center, Georgia Institute of Technology, 10 pages.
Roy Fielding, "wwwstat—manual," University of California, retrieved from http://ftp.ics.uci.edu/pub/websoft/wwwstat/wwwstat.html, on Jun. 12, 2006, 11 pages.
Matthew Reynolds, Beginning E-Commerce With Visual Basic, ASP, SQL Server 7.0 and MTS, "Starting Our Site", Chapter 2, 2000 Wrox Press, pp. 21-39.
Bamshad Mobasher, "Introduction," Jul. 16, 1997, retrieved from http://maya.cs.depaul.edu/.about.mobasher/webminer/survey/node1.html, on Apr. 18, 2006, 2 pages.
Bamshad Mobasher, "A Taxonomy of Web Mining," Jul. 16, 1997, retrieved from http://maya.cs.depaul.edu/.about.mobasher/webminer/survey/node2.html-, on Apr. 18, 2006, 1 page.
Bamshad Mobasher, "Web Content Mining," Jul. 16, 1997, retrieved from http://maya.cs.depaul.edu/.about.mobasher/webminer/survey/node3.html, on Apr. 18, 2006, 1 page.
Bamshad Mobasher, "Agent Based Approach," Jul. 16, 1997, retrieved from http://maya.cs.depaul.edu/.about.mobasher/webminer/survey/node4.html, on Apr. 18, 2006, 2 pages.
Bamshad Mobasher, "Database Approach," Jul. 16, 1997, retrieved from http://maya.cs.depaul.edu/.about.mobasher/webminer/survey/node5.html, on Apr. 18, 2006, 2 pages.
Bamshad Mobasher, "Web Usage Mining," Jul. 16, 1997, retrieved from http://maya.cs.depaul.edu/.about.mobasher/webminer/survey/node6.html, on Apr. 18, 2006, 2 pages.
Bamshad Mobasher, "Pattern Discovery Tools," Jul. 16, 1997, retrieved from http://maya.cs.depaul.edu/.about.mobasher/webminer/survey/node7.html, on Apr. 18, 2006, 1 page.
Bamshad Mobasher, "Pattern Discovery from Web Transactions," Jul. 16, 1997, retrieved from http://maya.cs.depaul.edu/.about.mobasher/webminer/survey/node9.html, on Apr. 18, 2006, 1 page.
Bamshad Mobasher, "Data Cleaning, " Jul. 16, 1997, retrieved from http://maya.cs.depaul.edu/.about.mobasher/webminer/survey/node11.html, on Apr. 18, 2006, 1 page.
Bamshad Mobasher, "Transaction Identification," Jul. 16, 1997, retrieved from http://maya.cs.depaul.edu/.about.mobasher/webminer/survey/node12.html, on Apr. 18, 2006, 2 pages.
Bamshad Mobasher, "Path Analysis," Jul. 16, 1997, retrieved from http://maya.cs.depaul.edu/.about.mobasher/webminer/survey/node14.html, on Apr. 18, 2006, 1 page.
Bamshad Mobasher, "Association Rules," Jul. 16, 1997, retrieved from http://maya.cs.depaul.edu/.about.mobasher/webminer/survey/node15.html, on Apr. 18, 2006, 1 page.
Bamshad Mobasher, "Sequential Patterns," Jul. 16, 1997, retrieved from http://maya.cs.depaul.edu/~mobasher/webminer/survey/node16.html, on Apr. 18, 2006, 1 page.
Bamshad Mobasher, "Clustering and Classification," Jul. 16, 1997, retrieved from http://maya.cs.depaul.edu/~mobasher/webminer/survey/node17.htm, on Apr. 18, 2006, 1 page.
Bamshad Mobasher, "Analysis of Discovered Patterns," Jul. 16, 1997, retrieved from http://maya.cs.depaul.edu/~mobasher/webminer/survey/node18.html, on Apr. 18, 2006, 1 page.
Bamshad Mobasher, "Visualization Techniques," Jul. 16, 1997, retrieved from http://maya.cs.depaul.edu/~mobasher/webminer/survey/node19.html, on Apr. 18, 2006, 1 page.
Bamshad Mobasher, "Data and Knowledge Querying," Jul. 16, 1997, retrieved from http://maya.cs.depaul.edu/~mobasher/webminer/survey/node21.html, on Apr. 18, 2006, 1 page.
Bamshad Mobasher, "Usability Analysis," Jul. 16, 1997, retrieved from http://maya.cs.depaul.edu/~mobasher/webminer/survey/node22.html, on Apr. 18, 2006, 1 page.
Bamshad Mobasher, "Web Usage Mining Architecture," Jul. 16, 1997, retrieved from http://maya.cs.depaul.edu/~mobasher/webminer/survey/node23.html, on Apr. 18, 2006, 3 pages.
Bamshad Mobasher, "Research Directions," Jul. 16, 1997, retrieved from http://maya.cs.depaul.edu/~mobasher/webminer/survey/node24.html, on Apr. 18, 2006, 1 page.
Bamshad Mobasher, "Data Pre-Processing for Mining," Jul. 16, 1997, retrieved from http://maya.cs.depaul.edu/~mobasher/webminer/survey/node25.html, on Apr. 18, 2006, 1 page.
Bamshad Mobasher, "The Mining Process," Jul. 16, 1997, retrieved from http://maya.cs.depaul.edu/~mobasher/webminer/survey/node26.html, on Apr. 18, 2006, 1 page.
Bamshad Mobasher, "Analysis of Mined Knowledge," Jul. 16, 1997, retrieved from http://maya.cs.depaul.edu/~mobasher/webminer/survey/node27.html, on Apr. 18, 2006, 1 page.
Bamshad Mobasher, "Pattern Analysis Tools, " Jul. 16, 1997, retrieved from http://maya.cs.depaul.edu/~mobasher/webminer/survey/node8.html, on Apr. 18, 2006, 1 page.
Bamshad Mobasher, "Conclusion," Jul. 16, 1997, retrieved from http://maya.cs.depaul.edu/~mobasher/webminer/survey/node28.html, on Apr. 18, 2006, 1 page.
Weiler et al., "Usability Lab Tools: One Year Later," CHI '94, Celebrating Interdependence, Conference Companion, 1994, p. 330.
"Using Norton pcANYWHERE for DOS," Symantec Corporation, 1994, 30 pages.
David Beckett, "Combined Log System," Computing Laboratory, University of Kent, 1995, retrieved from http://www.igd_fhg.de/archivve/1995_www95/papers/46/comblog.html on May 24, 2006, 8 pages.
Gerald M. O'Connell, "A New Pitch," Modem Media, May 1995, 8 pages.
John Nardone, "The Modem Media Internet Research and Involvement Scale {IRIS)," Modem Media, Feb. 1995, 3 pages.
John Houston, "A Vision of Advertising Technology—How it Will Work and Why Advertisers Must Involve Themselves in the Process," Modem Media, Aug. 1994, 6 pages.
McGraw et al., "Untangling the Woven Web: Testing Web-based Software," Reliable Software Technologies Corporation, Apr. 1, 1996, 9 pages.
"Nokia Launches WAP Toolkit 2.1 with New Mobile Phone Emulators, Additional Functionality for Developers, and a New API for Integration with Third-Party Development Environments," Feb. 6, 2001 [retrieved from http://company.nokia.com/en/news/press-releases/2001/02/06/nokia-launches-wap . . . , on Dec. 22, 2014] 4 pages.
United States Patent and Trademark Office, "Final Office Action," issued in connection with U.S. Appl. No. 11/805,497, dated Oct. 31, 2011, 18 pages.
United States Patent and Trademark Office, "Non-Final Office Action," issued in connection with U.S. Appl. No. 11/805,497, dated Sep. 30, 2010, 11 pages.
United States Patent and Trademark Office, "Final Office Action," issued in connection with U.S. Appl. No. 11/805,497, dated Mar. 27, 2015, 16 pages.
United States Patent and Trademark Office, "Final Office Action," issued in connection with U.S. Appl. No. 11/805,497, dated Jun. 29, 2017, 25 pages.
United States Patent and Trademark Office, "Non-Final Office Action," issued in connection with U.S. Appl. No. 11/805,497, dated Mar. 31, 2011, 15 pages.
United States Patent and Trademark Office, "Non-Final Office Action," issued in connection with U.S. Appl. No. 11/805,497, dated Mar. 14, 2014, 16 pages.
United States Patent and Trademark Office, "Non-Final Office Action," issued in connection with U.S. Appl. No. 11/805,497, dated Dec. 8, 2016, 30 pages.
United States Patent and Trademark Office, "Non-Final Office Action," issued in connection with U.S. Appl. No. 11/805,497, dated Jan. 10, 2018, 28 pages.
United States Patent and Trademark Office, "Notice of Allowance and Fee(s) Due," issued in connection with U.S. Appl. No. 11/805,497, dated Aug. 10, 2018, 12 pages.
United States Patent and Trademark Office, "Non-Final Office Action," issued in connection with U.S. Appl. No. 16/215,134, dated Aug. 20, 2019, 20 pages.
United States Patent and Trademark Office, "Final Office Action," issued in connection with U.S. Appl. No. 16/215,134, dated Apr. 23, 2020, 15 pages.

(56) References Cited

OTHER PUBLICATIONS

United States Patent and Trademark Office, "Notice of Allowance and Fee(s) Due," issued in connection with U.S. Appl. No. 16/215,134, dated Aug. 26, 2020, 14 pages.

Kotler et al., "Marketing Simulations: Review and Prospects", The Journal of Business, vol. 43, No. 3, Jul. 3, 1970, pp. 237-295, Published by: The University of Chicago (60 pages).

United States Patent and Trademark Office, "Notice of allowance and Fee(s) Due," in connection with U.S. Appl. No. 17/164,557, issued May 31, 2022, 8 pages.

* cited by examiner

| Device Usage Information ||||| Advertisement Attributes |||||
|---|---|---|---|---|---|---|---|---|
| Device | Device Usage | Device Usage Quantity | Time Of Usage | Location Of Usage | Ad ID | Ad Type | Ad Genre | Product/Service Advertised | Time Accessed |
| 1 | Internet - General Web Surfing | 20 | Morning | San Bruno, CA | 1 | Banner | Online Gaming | Internet Poker | 8:00am |
| | | | | | 2 | Pop-up Window | Pharmaceutical | Allergy Medicine | 8:25am |
| | | | | | 3 | Click-Through | Hygiene | Toothpaste | 9:30am |

METHODS AND APPARATUS FOR GENERATING INFORMATION ABOUT PORTABLE DEVICE ADVERTISING

CROSS REFERENCE TO RELATED APPLICATIONS

This patent arises from a continuation of U.S. patent application Ser. No. 17/164,557, filed Feb. 1, 2021, now U.S. Pat. No. 11,468,479, entitled "METHODS AND APPARATUS FOR GENERATING INFORMATION ABOUT PORTABLE DEVICE ADVERTISING;" which is a continuation of U.S. patent application Ser. No. 16/215,134, filed Dec. 10, 2018, now U.S. Pat. No. 10,909,578, entitled "METHODS AND APPARATUS FOR GENERATING INFORMATION ABOUT PORTABLE DEVICE ADVERTISING;" which is a continuation of U.S. patent application Ser. No. 11/805,497, filed on May 22, 2007, now U.S. Pat. No. 10,169,781, entitled "METHOD AND SYSTEM FOR GENERATING INFORMATION ABOUT PORTABLE DEVICE ADVERTISING;" and claims priority to U.S. Provisional Patent Application No. 60/905,678, filed Mar. 7, 2007, entitled "METHOD AND SYSTEM FOR GENERATING INFORMATION ABOUT PORTABLE DEVICE ADVERTISING." U.S. patent application Ser. No. 17/164,557; U.S. patent application Ser. No. 16/215,134; U.S. patent application Ser. No. 11/805,497; and U.S. Provisional Patent Application No. 60/905,678 are incorporated herein by reference in their entireties.

BACKGROUND OF THE INVENTION

While advertising was once limited to a few advertising medium, the development of more numerous and more capable portable devices has generated many new advertising medium. For example, mobile telephones, portable gaming devices, video game consoles, portable media devices, portable digital assistants (PDAs), handheld computer systems, etc. are now capable of rendering audio and/or video content. As such, advertisements may now be presented as part of a mobile television broadcast, bundled with videos and other content, and even placed within an application.

Despite the advertising opportunities that the new medium present, many businesses are hesitant to invest given the lack of information about advertising on portable devices. For example, little is known about the number of advertisements reaching consumers and the effect of those advertisements on the consumer. Further, little is known about which advertising medium is best suited to a given consumer profile, as well as how to best utilize a specific advertising medium to reach a consumer with the given consumer profile.

Conventional methods used to gather information about advertising on portable devices include surveying users of portable devices about presented advertisements. Surveying often produces inaccurate and incomplete information given the inability for a consumer to recall information about specific advertisements, information related to the presentation of the advertisement (e.g., time and location of the presentation, etc.), and the like. Additionally, it is difficult to assemble a panel of survey participants large and/or diverse enough to represent various cross-sections of society. Further, collection of survey information is tedious, time consuming, and expensive.

SUMMARY OF THE INVENTION

Accordingly, a need exists to generate information about advertising on portable devices that is more accurate and complete. A need also exists to generate this information more efficiently and with less cost. Additionally, a need exists for information about portable device advertising that is more representative of various cross-sections of society. Embodiments of the present invention provide novel solutions to these needs and others as described below.

Embodiments of the present invention are directed to a method and system for generating information about portable device advertising. More specifically, embodiments are directed to a mechanism for distinguishing advertisements accessed by actual portable devices and/or emulated portable devices, where the distinguished advertisements may then be used to generate information about portable device advertising. The advertisements may be communicated via any advertising medium (e.g., mobile television broadcasts, audio, videos, other content, applications, messages, etc.) accessible to portable devices (e.g., mobile telephones, portable gaming devices, video game consoles, portable media devices, portable digital assistants (PDAs), handheld computer systems, etc.), systems emulating portable devices, etc. Additionally, access to the advertisements may be controlled by actual usage of devices (e.g., a user changing a mobile TV channel, a user surfing to a given internet website, etc.), or alternatively, by simulated usage of the devices (actual or emulated) in accordance with simulation parameters (e.g., determined based upon a device usage profile, etc.). Actual device usage may also be gathered and accessed to configure and/or adjust the simulation parameters used in the simulations.

The information generated about portable device advertising may be based upon at least one attribute of the distinguished advertisement (e.g., a portable device and/or emulated portable device presenting the advertisement, a unique identifier of the advertisement, a genre of the advertisement, a product and/or service associated with the advertisement, a time and/or location of the presentation of the advertisement, an advertising medium associated with the advertisement, etc.). Thereafter, the information about portable device advertising may be processed and/or appended with device usage information (e.g., associated with accessed advertisements), additional information (e.g., census data, third-party data, etc.), etc., to provide updated information about portable device advertising.

As such, automatic identification of advertisements and generation of information about portable device advertising increases the accuracy and completeness of such information in addition to providing it in a more efficient and cost-effective manner. Further, the increased number of participating devices (e.g., actual devices controlled by users, actual devices simulating actual device usage, emulated devices simulating actual device usage, etc.) and the ability to simulate device usage in accordance with different device usage profiles provides information about portable device advertising which is more representative of various cross-sections of society.

BRIEF DESCRIPTION OF THE DRAWINGS

The present invention is illustrated by way of example, and not by way of limitation, in the figures of the accompanying drawings and in which like reference numerals refer to similar elements.

FIG. 3 shows exemplary advertising information in accordance with one embodiment of the present invention.

DETAILED DESCRIPTION OF THE INVENTION

Figure 1:
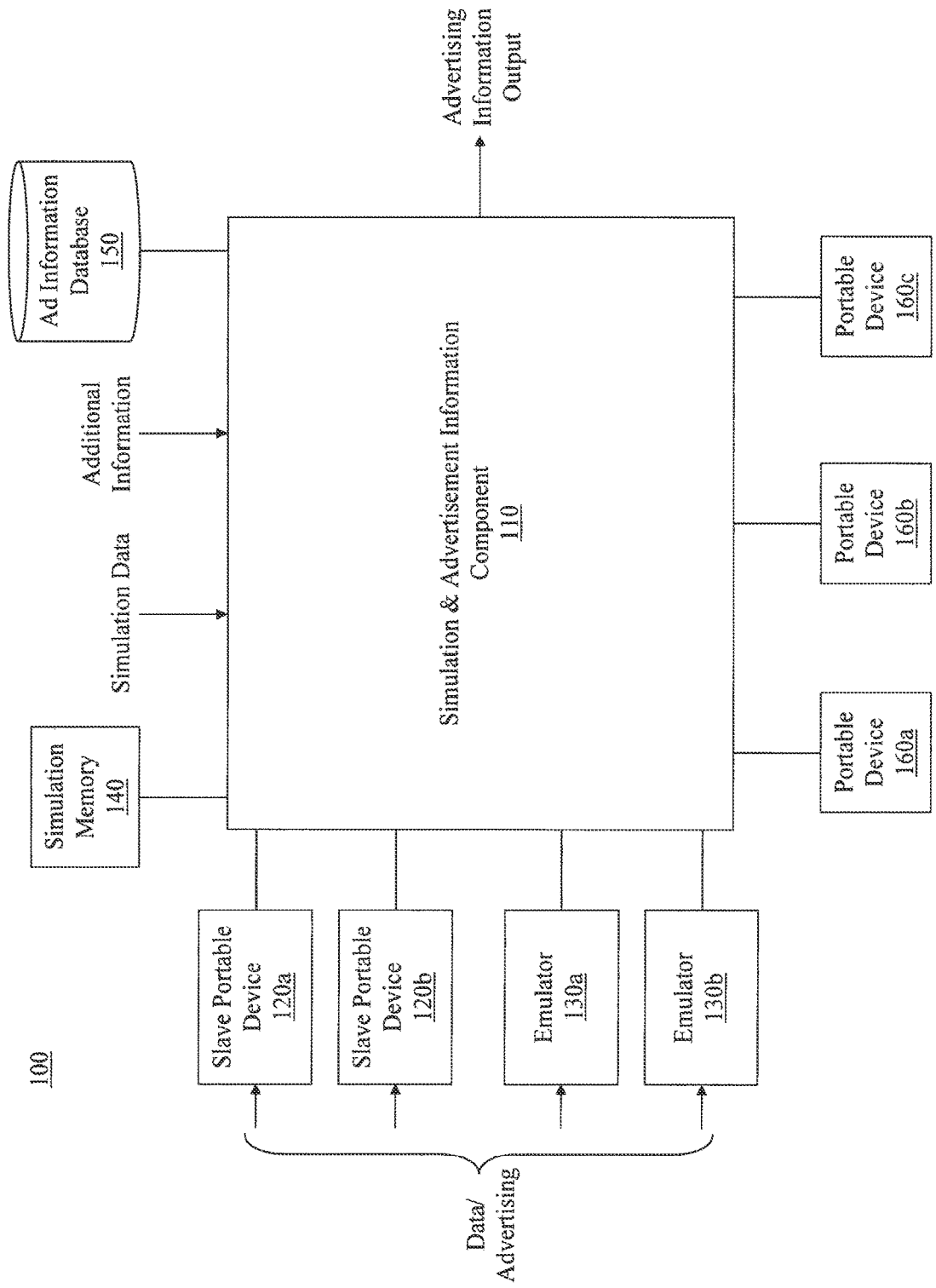
FIG. 1 shows a first exemplary system for generating information about portable device advertising by simulating portable device usage in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "adjusting," "analyzing," "applying," "assembling," "assigning," "calculating," "capturing," "combining," "comparing," "collecting," "controlling," "creating," "defining," "depicting," "determining," "displaying," "distinguishing," "establishing," "executing," "generating," "grouping," "identifying," "modifying," "moving," "outputting," "performing," "placing," "presenting," "processing," "programming," "querying," "removing," "repeating," "sampling," "sorting," "storing," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Using Simulation to Generate Information about Portable Device Advertising

FIG. 1 shows first exemplary system 100 for generating information about portable device advertising by simulating portable device usage in accordance with one embodiment of the present invention. As shown in FIG. 1, simulation and advertisement information component 110 is operable to simulate actual portable device usage using slave portable devices (e.g., 120a-120b) and/or emulators (e.g., 130a-130b), where the simulation may adjust or control the devices and/or emulators to access different advertising medium comprising advertisements. The simulation may be performed in accordance with simulation data input to component 110 and/or stored within simulation memory 140. The devices (e.g., 120a-120b) and/or emulators (e.g., 130a-130b) may distinguish advertising content from non-advertising content before communicating information about the accessed advertisements to component 110. Component 110 may then determine at least one attribute of the distinguished advertisements if not already performed by devices 120a-120b and/or emulators 130a-130b. Component 110 may further process the advertisement information before outputting it, or alternatively, may output the advertisement information without processing. Accordingly, embodiments provide efficient and cost-effective mechanisms for generating information about advertising on portable devices which reduce reliance upon user responses and feedback, thereby providing more accurate and complete information.

Devices 120a-120b may comprise mobile telephones, portable gaming devices, video game consoles, portable media devices, portable digital assistants (PDAs), handheld computer systems, etc. Each device may receive data comprising advertisements over one or more wired and/or wireless networks utilizing various signaling techniques and/or protocols (e.g., TCP/IP, Bluetooth, IEEE 802.11a, IEEE 802.11b, IEEE 802.11g, CDMA, WCDMA, TDMA, 3G, LMDS, MMDS, etc.). Additionally, devices 120a-120b may communicate advertisement information to component 110 (e.g., with or without encoding, encryption, etc.) over one or more wired and/or wireless networks. In one embodiment, devices 120a-120b may receive data comprising advertisements over the same network or networks used to communicate with component 110.

Emulators 130a-130b may comprise any system or device capable of emulating a portable device, where emulators 130a-130b may comprise hardware and/of software for receiving data comprising advertisements as well as communicating with component 110. Each emulator may receive data comprising advertisements over one or more wired and/or wireless networks utilizing various signaling techniques and/or protocols (e.g., TCP/IP, Bluetooth, IEEE 802.11a, IEEE 802.11b, IEEE 802.11g, CDMA, WCDMA, TDMA, 3G, LMDS, MMDS, etc.). Additionally, emulators 130a-130b may communicate advertisement information to component 110 (e.g., with or without encoding, encryption, etc.) over one or more wired and/or wireless networks. In one embodiment, emulators 130a-130b may receive data comprising advertisements over the same network or networks used to communicate with component 110.

Devices 120a-120b and/or emulators 130a-130b may access many types of content which contain advertising material. For example, mobile television broadcasts may comprise advertisements similar to television commercials. Downloadable content (e.g., videos, music, etc.) may be bundled with advertisements. Similarly, streaming content may comprise advertisements as part of the stream initialization, interspersed within the stream, etc. Advertisements may also be placed within messages (e.g., SMS, MMS, etc.). Further, advertisements may be placed within applications used for web browsing (e.g., banners, pop-up windows, etc.), games (e.g., as product placements accessed during game play, bundled with the game, etc.), downloaded client applications, etc. And in other embodiments, other types of data may be accessed which comprises advertisements.

While simulating actual device usage in accordance with simulation parameters (e.g., input to component 110, accessed by component 110, determined by component 110, etc.), component 110 (e.g., alone or in conjunction with simulation execution components of one or more of devices 120a-120b and/or emulators 130a-130b) may control which type of data is accessed as well as how each type of data is accessed. For example, the simulation may not only switch between different types of content, but may also control the duration of each access, the time of each access, characteristics of each access (e.g., mobile TV channel, website, specific game or game genre, etc.), etc. Additionally, the simulation may alter the location of the data accesses, where the location may represent a physical location (e.g., nation, state, city, street, coordinate, etc.) of an actual device being simulated. The location may be altered by automatically varying an input (e.g., inputting a location identifier), or alternatively, by activating a device (e.g., 120a-120b) or emulator (e.g., 130a-130b) in a different physical location. In one embodiment, the devices and/or emulators in different physical locations may have one or more identical simulation parameters (e.g., other than location) such that activation of devices in different location effectively varies location without changing other variables, hence making it easier to identify the effect of physical location on the collected advertisement information.

It should be appreciated that the advertising content accessed by a portable device may vary considerably among the different advertising medium providing access to different data types. Further, it should be appreciated that the advertising content accessed via the same advertising medium (e.g., comprising the same data type) may vary considerably when accessed at different times, locations, with different access characteristics, etc. As such, embodiments of the present invention enable accurate and efficient simulation of many different varieties of actual device usage, where each device usage characteristic may be adjusted and/or specified to vary the simulation.

As shown in FIG. 1, actual portable devices 160a-160c may be coupled to component 110 to provide information about actual device usage, where the actual device usage information may then be used to adjust the simulation parameters and alter, or alternatively implement, the simulation. For example, if component 110 were simulating usage of a given category of person (e.g., of a given age, race, sex, demographic, or some other personal characteristic) using one of devices 120a-120b or emulators 130a-130b, then usage data from an actual device (e.g., of one of devices 160a-160c) controlled by an actual user (e.g., who is also in the category of person being simulated) may be used to adjust the simulation. As a more specific example, if the simulation currently allocates 10 minutes a day to internet and 60 minutes a day to mobile television for a given category of user, but actual device usage shows that persons of that category use both Internet and mobile television for 10 minutes a day, then the simulation parameters relating to the duration of mobile television usage may be adjusted accordingly (e.g., taking into account the number of simulated users of that category, the usage information from other actual users in that category, etc.).

During the simulation, data comprising advertisements will be accessed by devices (e.g., 120a-120b) and/or emulators (e.g., 130a-130b). Components of the devices and/or emulators must then distinguish advertising content from non-advertising content. In one embodiment, advertisements may be distinguished by sampling portions of the data comprising the advertisements and comparing the sampled portions to portions of known advertisements (e.g., where a match or a near match may indicate advertising content). For example, one or more sampled pixels may be compared to pixels of known advertisements (e.g., stored in remote database accessible by the devices and/or emulators, stored in a memory of the devices and/or emulators, etc.). Alternatively, one or more frames of the data may be compared with frames of known advertisements (e.g., stored in remote database accessible by the devices and/or emulators). And in another embodiment, encoded information indicating an advertisement may be read from the data to distinguish an advertisement.

Once advertising content is distinguished, at least one attribute of the advertisement may be determined. Determined attributes of the advertisements may comprise, for example, a portable device and/or emulated portable device presenting the advertisement, a unique identifier of the advertisement, a genre of the advertisement, a product and/or service associated with the advertisement, a time and/or location of the presentation of the advertisement, an advertising medium associated with the advertisement, etc. The attribute determination may be performed by a component of the device (e.g., 120a, 120b, etc.) or emulator (e.g., 130a, 130b, etc.) accessing the advertisement, where the device or emulator may then communicate any determined attributes to component 110 for processing. Alternatively, the device or emulator accessing the advertisement may send portions of the content back to component 110 for subsequent determination of advertisement attributes.

After receiving the advertisement information (e.g., advertisement attributes, advertisement content, etc.), component 110 may process the advertisement information (e.g., before storage in advertisement information database 150, after storing and subsequently accessing the advertisement information from database 150, etc.). In one embodiment, information from the simulation (e.g., simulation parameters, device usage characteristics, etc.) may be applied to the advertisement information (e.g., to enable indexing of the advertisement information based upon the information from the simulation). In another embodiment, additional information (e.g., input to component 110) may be applied to the advertisement information (e.g., to enable indexing of the advertisement information based upon the information from the simulation), where the additional information may comprise census data, third-party information (e.g., related to a market associated with the chosen simulation parameters, survey responses of actual users who fit the profile of a simulated user, etc.), etc. In other embodiments, component 110 may decode, decrypt, organize, sort, filter, clean, etc. the advertisement information. Further, component 110 may perform chronological trending on the advertisement information (e.g., stored in database 150), where a date and/or time associated with each advertisement (e.g., determined by a timestamp encoded within the data, determined by a time associated with the access by the device or emulator, etc.) is used to determine changes in the advertisement information over time. And in other embodiments, the processing of the advertisement information performed by component 110 may comprise appending, modifying, removing, etc. the advertisement information stored within database 150.

Component 110 may output or otherwise allow access to the advertisement information (e.g., stored in database 150). For example, the advertisement information may be output as a datafeed, via an online software user interface, via a software user interface installed on a client computer, as a presentation using spreadsheets, charts, tables, etc. The advertisement information may be output in response to an information selection input (e.g., to component 110), where the input may be from a system, device, user, etc. The input may identify a cross-section of society for which advertisement information is sought, one ore more device usage characteristics used to group the advertisement information, one or more attributes of the advertisements for which information has been collected, etc. As such, the input may be used to customize and/or adjust the advertisement information output from component 110.

Although FIG. 1 depicts a specific number of slave portable devices (e.g., 120a-120b), emulators (e.g., 130a-130b) and portable devices (e.g., 160a-160c), it should be appreciated that a larger or smaller number of each device may be used in other embodiments. Accordingly, embodiments provide scalability (e.g., enabling the automatic addition of devices and/or emulators), where the scalability enables the collection of more advertisement information for more complete and representative information. Additionally, the ability to add, modify or remove simulation parameters (e.g., automatically, manually, etc.) to configure the simulation provides the ability to generate information for many cross-sections of society (e.g., through the use of simulation parameters to apply device usage characteristics or profiles to the devices and/or emulators that represent a given grouping of society, etc.).

It should also be appreciated that any combination of devices (e.g., slave portable devices, emulators and portable devices) may be used in other embodiments, where one or more of the device types may not be used in various embodiments. Additionally, although component 110 is depicted in FIG. 1 as a single component, it should be appreciated that component 110 may be partitioned into multiple components in other embodiments. Further, although component 110 is depicted in FIG. 1 as distinct from devices 120a-120b and emulators 130a-130b, it should be appreciated that component 110 may be located (e.g., in whole, in part, etc.) in one or more of the devices and/or emulators in other embodiments.

Figure 2:
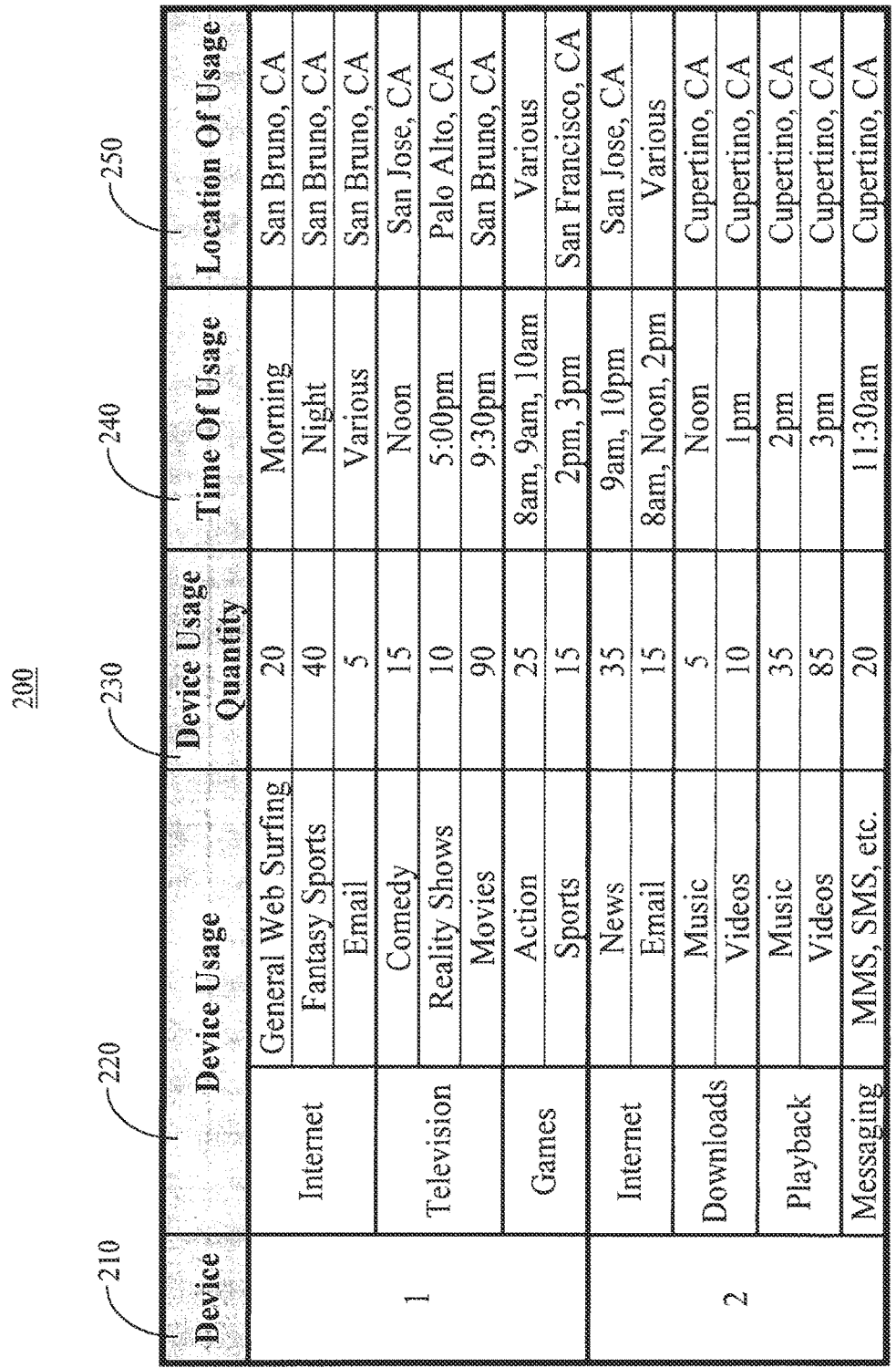
FIG. 2 shows exemplary device usage information in accordance with one embodiment of the present invention.

FIG. 2 shows exemplary device usage information 200 in accordance with one embodiment of the present invention. As shown in FIG. 2, columns 210 through 250 comprise device usage characteristics. For example, column 210 identifies a device, which may correspond to a slave portable device (e.g., 120a-120b of FIG. 1), an emulator (e.g., 130a-130b of FIG. 1) or an actual portable device (e.g., 160a-160c). Column 220 identifies usage of the device, emulator, etc., where the usage may be specified at several levels of abstraction (e.g., internet-related usage, or rather a more specific breakdown of internet usage comprising general web surfing, fantasy sports usage and email usage).

Column 230 indicates a device usage quantity, which may specify device usage quantities at various levels of abstraction. For example, as depicted in FIG. 2, the device usage quantities may be associated with the lowest level of abstraction of the device usage, but in other embodiments, may be associated with a higher level of abstraction (e.g., the device usage quantity for device 1 for internet usage may be 65, which is the sum of the device usage quantities for general web surfing, fantasy sports usage and email usage). In one embodiment, the device usage quantity may represent a duration of usage (e.g., in units of time, etc.). In other embodiments, the device usage quantity may represent a weighted duration of time (e.g., where a weighting factor is applied to the actual duration to account for underrepresented usage, etc.). Alternatively, the device usage quantity represented in column 230 may be represented as a percentage of a total usage (e.g., all portable device usage for a given period of time, device usage of a certain type for a given period of time, etc.).

As shown in FIG. 2, column 240 represents a time of the device usage. The time of usage may be represented as a general time of day (e.g., morning) or a more specific time of day (e.g., 8:00 am). Alternatively, the time of usage may be represented by multiple times of day (e.g., general, specific, etc.). Additionally, column 250 represents a location of device usage.

In one embodiment, device usage information 200 may represent a device usage profile applied to devices (e.g., 120a-120b of FIG. 1) and/or emulators (e.g., 130a-130b of FIG. 1) used to simulate actual device usage. A device usage profile may comprise a plurality of device usage characteristics (e.g., type of usage, time of usage, location of usage, etc.). As such, the device usage (e.g., represented in column 220) is that performed on the devices and/or emulators as part of the simulation, where the simulation may be performed in accordance with other device usage characteristics related to the usage in column 220.

In another embodiment, device usage information 200 may represent actual device usage of actual devices (e.g., 160a-160c of FIG. 1). As such, the device usage (e.g., represented in column 220) is that performed by the user on the devices, which may then be used to adjust the simulation of actual device usage (e.g., as described above with respect to FIG. 1).

Although FIG. 2 depicts device usage information for only two devices, it should be appreciated that the information may pertain to a larger or smaller number of devices in other embodiments. Additionally, it should be appreciated that the device usage characteristics depicted in columns 220-250 are merely exemplary, and thus, may vary in number, type, etc. in other embodiments.

FIG. 3 shows exemplary advertisement information 300 in accordance with one embodiment of the present invention. As shown in FIG. 3, advertisement information 300 comprises a portion of device usage information 200 applied to advertisement attributes 310. In one embodiment, the advertisement attributes 310 may comprise an advertisement identifier, advertisement type, advertisement genre, a product or service advertised, and a time of the access. For example, attributes 310 show that three advertisements (e.g., one banner, one pop-up window, and one click-through advertisement) were accessed while surfing the internet for twenty minutes in the morning in San Bruno, Calif. As such, where device usage information 200 is that used to conduct a simulation as described with respect to FIGS. 1 and 2 above, advertisement attributes may represent the results of the simulation (e.g., information about the advertisements accessed) performed according to the device usage information.

In addition to providing insight into audience penetration of various advertisements (e.g., the number of advertisements accessed, the type of advertisements accessed, etc.), application of device usage information 200 (e.g., representing information from the simulation, simulation parameters, etc.) to the resulting attributes 310 additionally provides insight into which types of users, types of device usage, etc. result in such access to advertisements. Thus, embodiments enable the resulting advertisement information (e.g., output by component 110) to be indexed, sorted, etc. based upon additional device usage characteristics corresponding to the advertisement attributes, thereby increasing the relevance (e.g., to certain types of users, markets, etc.) and utility of such information.

Although not depicted in FIG. 3, other types of information may be added to advertisement attributes 310 in other embodiments. In one embodiment, census data and/or demographical information may be applied to information 310. For example, demographical information for San Bruno, Calif. (e.g., the location of the device usage depicted in FIG. 3) may be applied to attributes 310. In another embodiment, survey responses (e.g., from a survey respondent who falls into a categorical grouping corresponding to device usage 200) may be applied to information 310. Alternatively, other third-party information related to at least one device usage characteristic and/or advertisement attribute may be applied to attributes 310. Further, it should be appreciated that more than one type of information may be applied to attributes 310 in other embodiments.

Although FIG. 3 depicts advertisement information for only one device, it should be appreciated that the information may pertain to a larger or smaller number of devices in other embodiments. Additionally, it should be appreciated that the advertisement attributes represented as attributes 310 in FIG. 3 are merely exemplary, and thus, may vary in number, type, etc. in other embodiments. Further, it should be appreciated that information 300 may comprise only attributes 310 (e.g., without information 200, additional information, etc.) in another embodiment.

Figure 4:
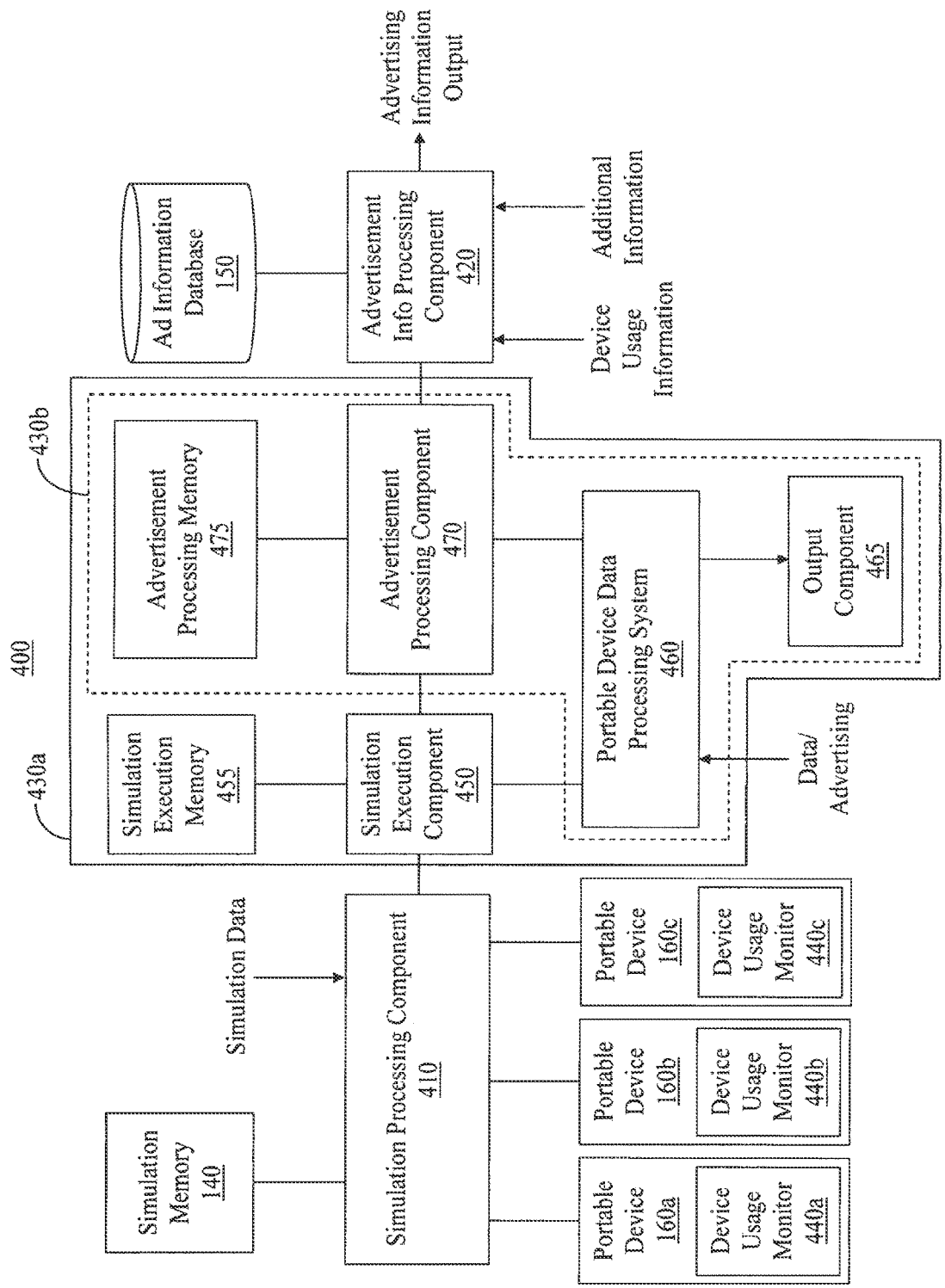
FIG. 4 shows a second exemplary system for generating information about portable device advertising by simulating portable device usage in accordance with one embodiment of the present invention.

FIG. 4 shows second exemplary system 400 for generating information about portable device advertising by simulating portable device usage in accordance with one embodiment of the present invention. As shown in FIG. 4, system 400 is operable to generate information about advertising on portable devices similar to that of system 100, where the functionality of component 110 of FIG. 1 may be performed by simulation processing component 410 and advertisement information processing component 420. Additionally, in one embodiment, device/emulator 430a may operate similar to slave portable devices 120a-120b and/or emulators 130a-130b. In another embodiment, device/emulator 430b may operate similar to slave portable devices 120a-120b and/or emulators 130a-130b.

Simulation processing component 410 is operable to simulate actual portable device usage using device/emulator 430a or device/emulator 430b, where the simulation may adjust or control the devices/emulators to access different advertising medium comprising advertisements. The simulation may be performed in accordance with simulation data input to component 410 and/or stored within simulation memory 140. In one embodiment, the simulation parameters may be determined from device usage information (e.g., 200) supplied to component 410. The device/emulator (e.g., 430a or 430b) may distinguish advertising content from non-advertising content before communicating information about the accessed advertisements to advertisement information processing component 420. Component 420 may then determine at least one attribute of the distinguished advertisements if not already performed by the device/emulator (e.g., as described with respect to component 110 of FIG. 1). In one embodiment, attributes may be determined for a distinguished advertisement by accessing a database comprising advertisement attributes for known advertisements, where the database may be indexed based upon at least one known attribute of the advertisement (e.g., advertisement identifier, etc.). Advertisement information may be stored in database 150 for subsequent access, modification, removal, etc. as described above with respect to FIG. 1. Component 420 may further process the advertisement information (e.g., as described with respect to component 110 of FIG. 1) before outputting it, or alternatively, may output the advertisement information without processing (e.g., as described with respect to component 110 of FIG. 1).

As shown in FIG. 4, actual portable devices 160a-160c may be coupled to component 410 to provide information about actual device usage as described above with respect to FIG. 1. The information about actual device usage may be collected by device usage monitors 440a-440c, which are operable to monitor, store, and access actual usage of the portable device by a user. In one embodiment, the device usage may be monitored as discussed in U.S. Pat. Nos. 6,745,011 and 6,754,470, the disclosure of which are hereby incorporated by reference. Once the information about actual device usage is accessed (e.g., from a memory internal to the portable device), it may be communicated to component 410 for making appropriate adjustments to the simulation.

As shown in FIG. 4, component 410 is coupled to simulation execution component 450 of device/emulator 430a, where component 450 is responsible for carrying out the execution of the simulation. Information related to simulations (e.g., simulation data used to simulate actual device usage, simulation parameters affecting how the simulation is executed, etc.) may be stored within simulation execution memory 455, where information to be stored may be communicated by component 410, accessed and modified by component 450, etc. Portable device data processing system 460 is operable to receive data comprising advertising content (e.g., internet data, mobile TV data, etc.), where the data may be processed and/or output via output component 465. Component 450 may be coupled to system 460 for controlling and/or adjusting the state of system 460 during execution of the simulation. For example, component 450 may change the channels of a mobile TV presentation, change websites accessed via the internet, etc., where the control and/or adjustment of system 460 may be in accordance with simulation parameters as discussed above with respect to FIG. 1.

Advertisement processing component 470 is coupled to system 460 for accessing the data comprising advertisements and for distinguishing advertising content from non-advertising content (e.g., as discussed with respect to devices 120a-120b and emulators 130a-130b of FIG. 1). Advertisement processing memory 475 may be used to store information about known advertisements to enable component 470 to distinguish advertising material from non-advertising material. In one embodiment, once component 470 has distinguished an advertisement, it may communicate information about the advertising content (e.g., one or more pixels, one or more frames, other data, encoded information, etc.) to component 420 for subsequent determination of advertisement attributes (e.g., 310) and/or processing as discussed above. The information about the advertising content may be stored in memory 475 for subsequent access, modification, etc. In another embodiment, component 470 may distinguish advertising material as well as determine advertisement attributes (e.g., 310). As such, memory 475 may be used to store information about the advertising content and/or information about the determined attributes (e.g., 310). Component 470 may transmit the determined advertisement attributes to component 420 for further processing as discussed above.

As shown in FIG. 4, device usage information may be input to component 420 for subsequent application to the advertising attributes as discussed above with respect to the previous Figures. The device usage information (e.g., 200) may be input from component 410 directly, from component 450 via component 470, or directly to component 420 from an alternate source.

Device/emulator 430b differs from device/emulator 430a in that component 450 and memory 455 are located externally to device/emulator 430b. As such, component 450 may control system 460 from outside device/emulator 430b. In one embodiment, component 450 may reside in a centralized system, device or component (e.g., 110 of FIG. 1) coupled to device/emulator 430b. And in another embodiment, component 450 may reside in another device (e.g., 120a, 120b, etc.) and/or emulator (e.g., 130a, 130b, etc.) used in the simulation.

Although components 410 and 420 are depicted in FIG. 4 as individual components, it should be appreciated that component 410 and/or 420 may be partitioned into multiple components in other embodiments. Further, although components 410 and 420 are depicted in FIG. 4 as distinct from device/emulator 430a and 430b, it should be appreciated that component 410 and/or 420 may be located (e.g., in whole, in part, etc.) in one or more devices and/or emulators in other embodiments. Additionally, although device/emulator 430a and device/emulator 430b depict specific groupings of components of system 400, it should be appreciated that device/emulator 430a and/or 430b may comprise a different grouping of components in other embodiments.

Figure 5A:
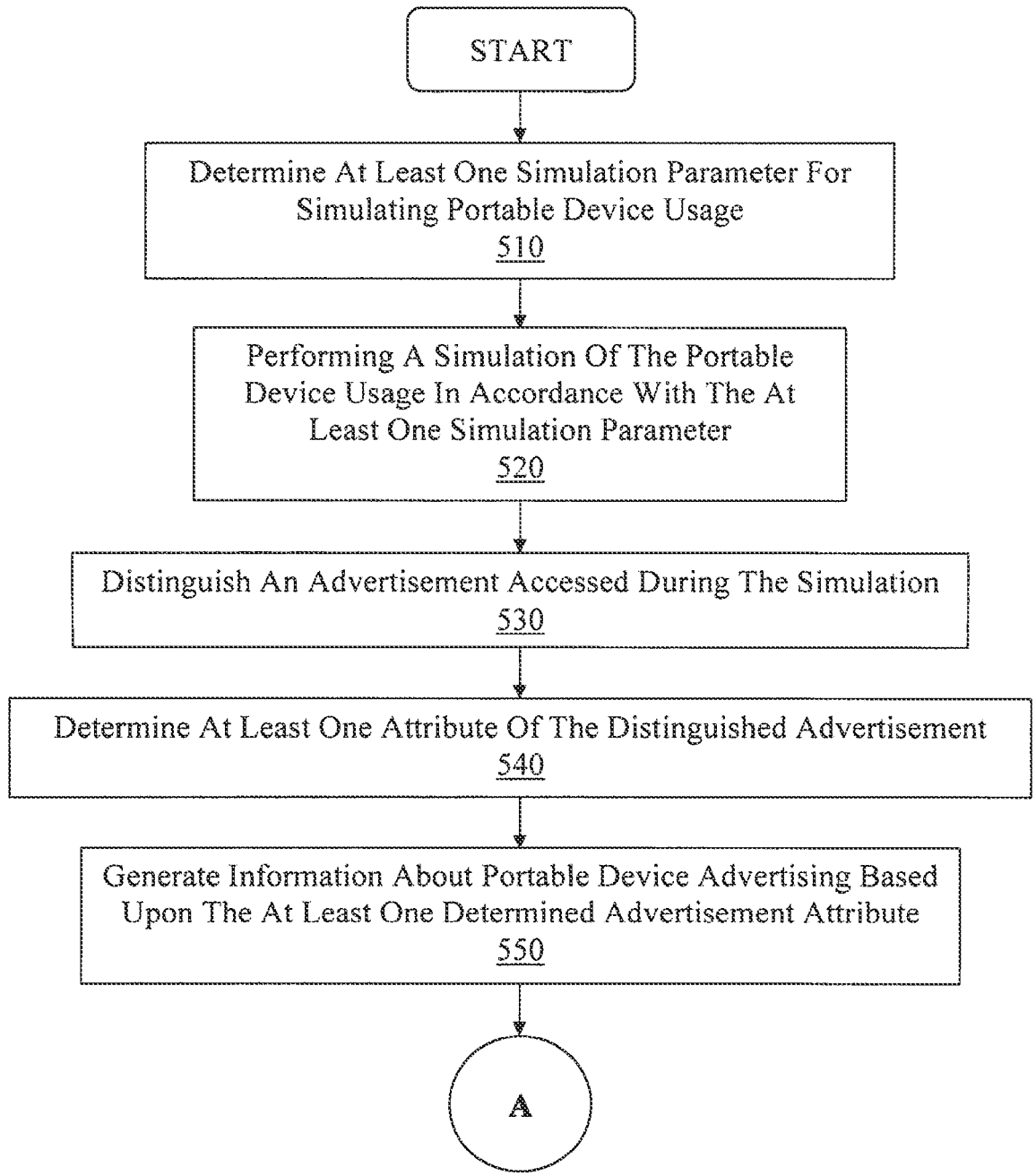
FIG. 5A shows a first portion of a computer-implemented process for generating information about advertising on portable devices by simulating portable device usage in accordance with one embodiment of the present invention.
Figure 5B:
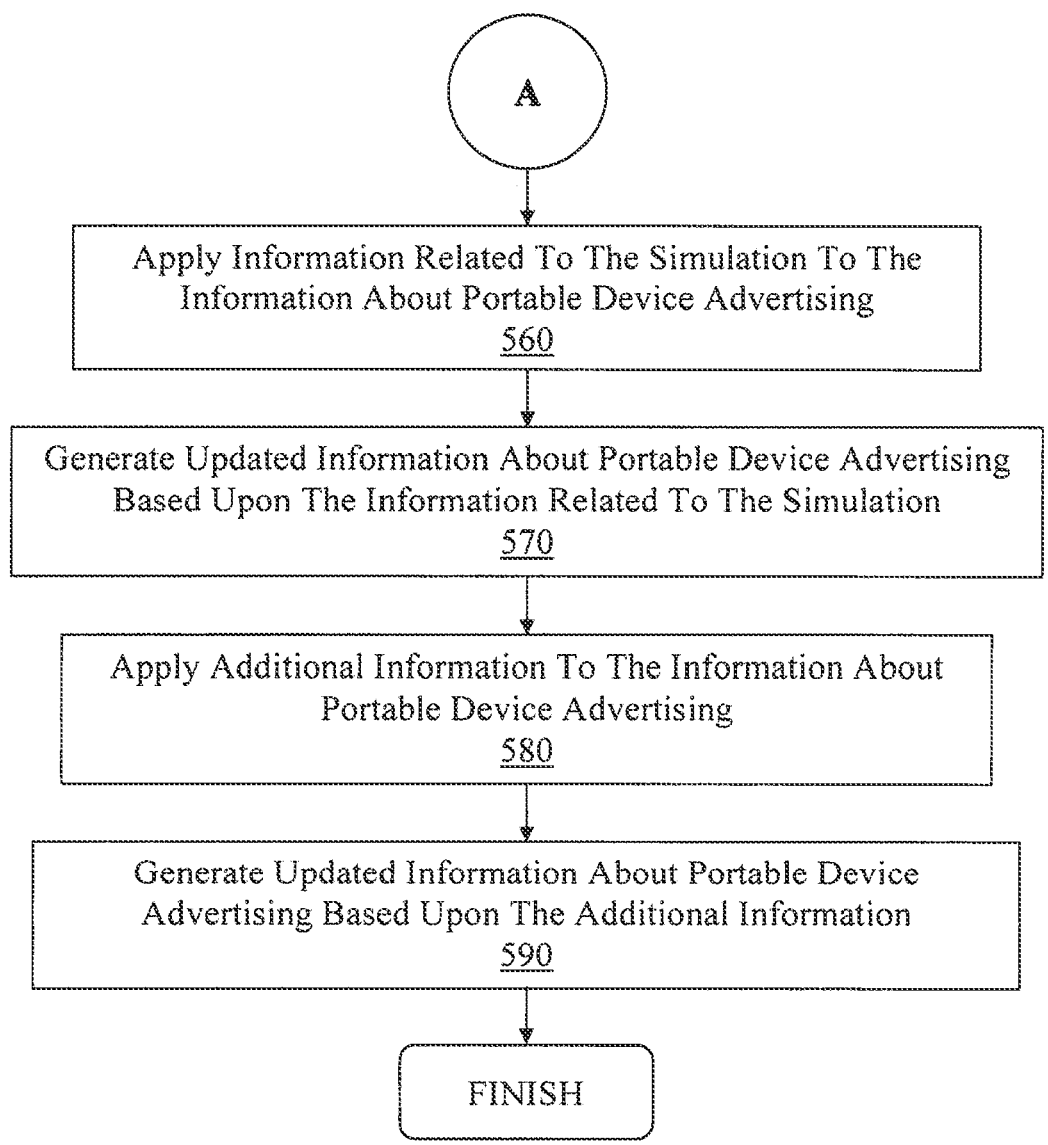
FIG. 5B shows a second portion of a computer-implemented process for generating information about advertising on portable devices by simulating portable device usage in accordance with one embodiment of the present invention.

FIGS. 5A and 5B show computer-implemented process 500 for generating information about advertising on portable devices by simulating portable device usage in accordance with one embodiment of the present invention. As shown in FIG. 5A, step 510 involves determining at least one simulation parameter for simulating portable device usage. The simulation parameter may be automatically determined, be input by a user, etc. In one embodiment, the simulation parameter may be determined from at least one device usage characteristic (e.g., a type of use, duration of use, location of use, etc.) of a selected device user profile. For example, a selected device usage profile may correspond to a specific cross-section of society (e.g., all Asian males between the ages of 21 and 30 in the United States) such that each device or emulator assigned that profile may simulate usage of a member of that cross-section of society (e.g., by using simulation parameters corresponding to device usage characteristics of the selected device usage profile).

Step 520 involves performing a simulation of the portable device usage in accordance with the at least one simulation parameter determined in step 510. The simulation may comprise changing, altering, adjusting, etc. the content accessed by the device or emulator (e.g., changing a mobile TV channel, surfing to a different website on the internet, etc.) such that different advertisements are accessed by the device or emulator.

As shown in FIG. 5A, step 530 involves distinguishing an advertisement accessed during the simulation. The advertisement may be distinguished from non-advertising content by, for example, comparing one or more pixels of potential advertisements with one or more pixels of known advertisements. Alternatively, one or more frames of potential advertisements may be compared with one or more frames of known advertisements. And in another embodiment, encoded information indicating an advertisement may be read from the data comprising potential advertisements to distinguish an advertisement.

Step 540 involves determining at least one attribute of the distinguished advertisement. Advertisement attributes (e.g., 310) may comprise, for example, a portable device and/or emulated portable device presenting the advertisement, a unique identifier of the advertisement, a genre of the advertisement, a product and/or service associated with the advertisement, a time and/or location of the presentation of the advertisement, an advertising medium associated with the advertisement, etc. In one embodiment, such a determination may be made by accessing a database or memory (e.g., 475) comprising advertisement attributes for known advertisements, where the database may be indexed based upon at least one known attribute of the advertisement (e.g., advertisement identifier, etc.).

As shown in FIG. 5A, step 550 involves generating information about portable device advertising based upon at least one of the determined advertisement attributes. The information may be generated by processing the advertisement attributes (e.g., sorting, filtering, cleaning, performing trending to show differences in the information over time, preparing the information for output, etc.).

As shown in FIG. 5B, step 560 involves applying information related to the simulation (e.g., 200) to the information about portable device advertising (e.g., 310) generated in step 550. The information related to the simulation may comprise a device usage profile for which at least one simulation parameter was determined (e.g., in step 510) and upon which the simulation was based. In one embodiment, applying information related to the simulation to the portable device advertising may result in advertising information as represented by information 300 of FIG. 3.

Step 570 involves generating updated information about portable device advertising based upon the information related to the simulation. The information may be generated by processing the advertisement attributes and the information related to the simulation (e.g., sorting, filtering, cleaning, performing trending to show differences in the information over time, preparing the information for output, etc.).

As shown in FIG. 5B, step 580 involves applying additional information to the information about portable device advertising (e.g., 310) generated in step 550. The additional information may comprise census data, demographical data, third-party data, data from survey responses, etc. Additionally, the additional data applied to the information about portable device advertising may relate to a device usage characteristic and/or an advertisement attribute.

Step 590 involves generating updated information about portable device advertising based upon the additional information. The information may be generated by processing the advertisement attributes and the additional information (e.g., sorting, filtering, cleaning, performing trending to show differences in the information over time, preparing the information for output, etc.).

Figure 6:
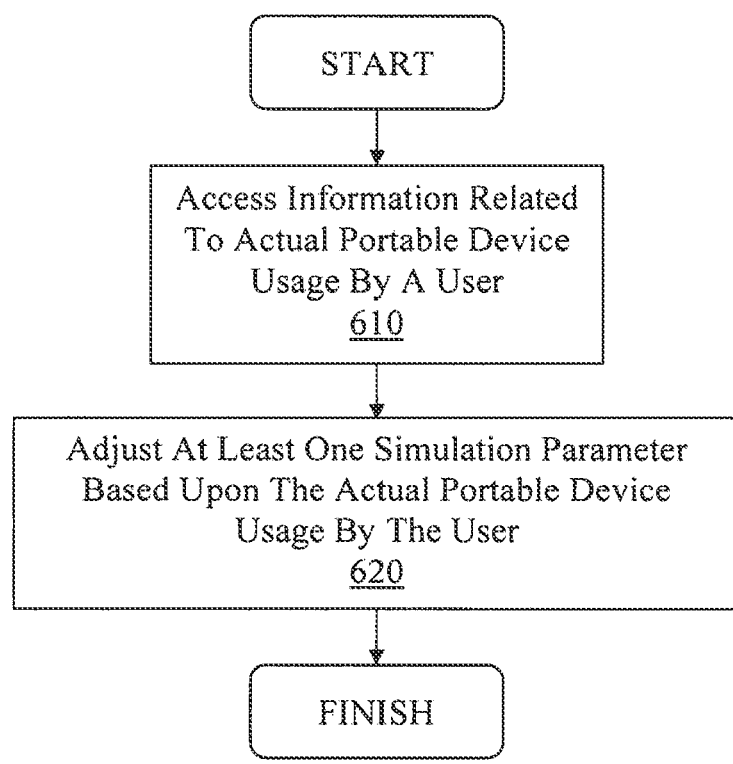
FIG. 6 shows a computer-implemented process for adjusting a simulation of actual portable device usage based upon actual device usage in accordance with one embodiment of the present invention.

FIG. 6 shows computer-implemented process 600 for adjusting a simulation of actual portable device usage based upon actual device usage in accordance with one embodiment of the present invention. As shown in FIG. 6, step 610 involves accessing information related to actual portable device usage by a user. The information may provide a value for a device usage characteristic associated with a simulation parameter used by a simulation of actual portable device usage. For example, if a simulation is simulating internet device usage of an 18-year-old female in the United States, information may be accessed which provides insight into actual device use by users who are 18 years of age, female, and reside in the United States.

Step 620 involves adjusting at least one simulation parameter based upon the actual portable device usage by the user. For example, if the information accessed in step 610 indicates that an 18-year-old female in the United States uses the internet for an hour a day, then the simulation parameter for causing the simulation to use the web for only 20 minutes a day may be adjusted (e.g., increased). The adjustment may take into account the number of simulated users of that category (e.g., 18-year-old females living in the United States), the usage information from other actual users in that category, etc. As such, the simulation of actual device usage will more accurately reflect actual device usage for a given cross-section of society.

Figure 7:
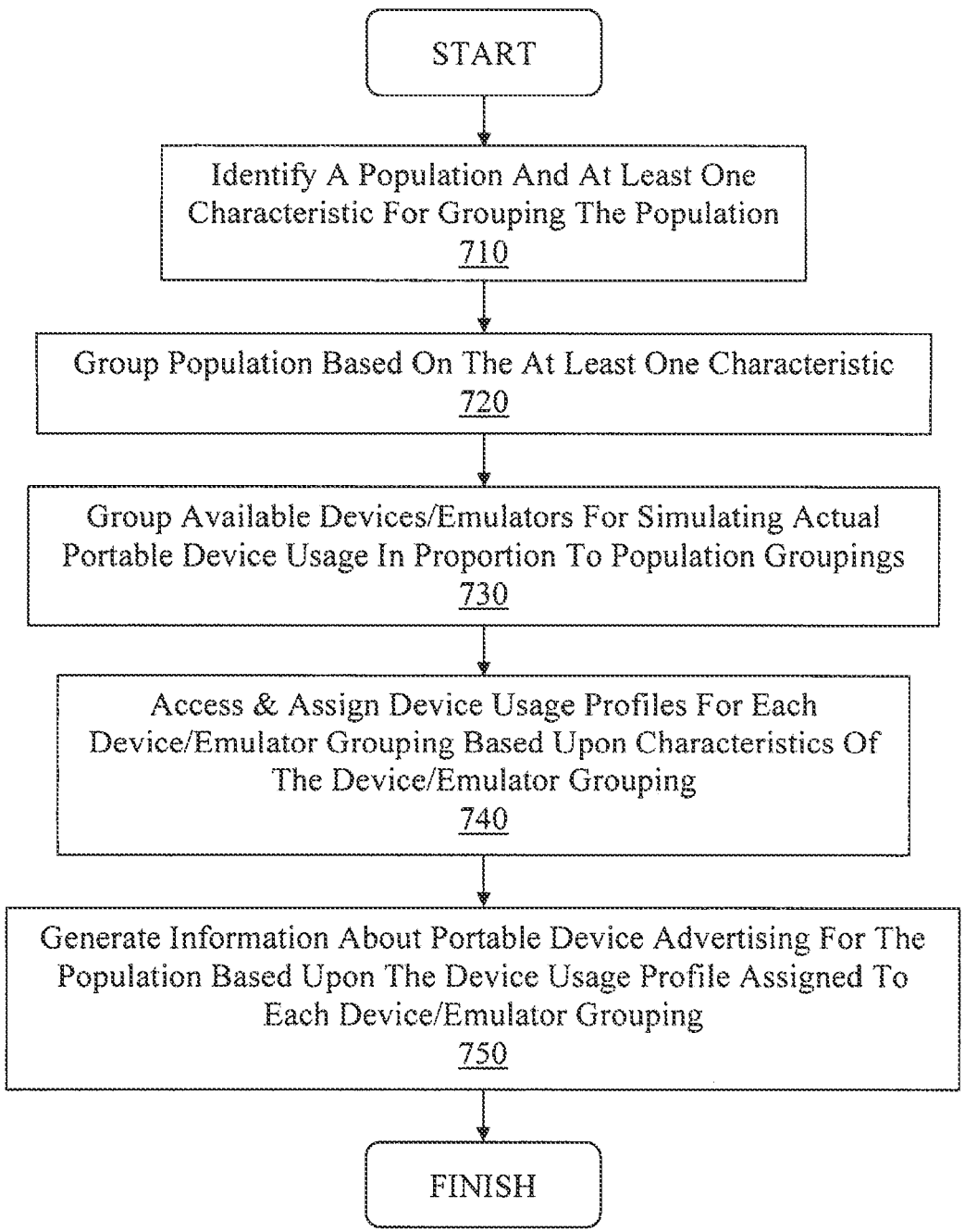
FIG. 7 shows a computer-implemented process for generating information about portable device advertising which is more representative of various cross-sections of society in accordance with one embodiment of the present invention.

FIG. 7 shows computer-implemented process 700 for generating information about portable device advertising which is more representative of various cross-sections of society in accordance with one embodiment of the present invention. As shown in FIG. 7, step 710 involves identifying a population and at least one characteristic for grouping that population. For example, the population may be that of the United States, while the characteristic for grouping the population of the United States may be age.

Step 720 involves grouping the population based on the at least one characteristic. For example, grouping the United States into groupings based upon age may provide the information shown in Table 1.

TABLE 1

| Age | Percentage of Population of United States |
|---|---|
| 0-20 | 30% |
| 21-50 | 30% |
| 51-80 | 30% |
| 81+ | 10% |

As shown in FIG. 7, step 730 involves grouping the available devices/emulators for simulating actual portable device usage in proportion to the population groupings of step 720. For example, if there were 10 devices and/or emulators available to simulate actual portable device usage, then the device/emulator groupings may be represented as depicted in Table 2.

TABLE 2

| Age | Device Numbers To Simulate The Age |
|---|---|
| 0-20 | 1-3 |
| 21-50 | 4-6 |
| 51-80 | 7-9 |
| 81+ | 10 |

Step 740 involves accessing and assigning device usage profiles for each device/emulator grouping based upon characteristics of the device/emulator grouping. For example, a first device usage profile associated with those ages 0-20 in the United States may be assigned to the first group of three devices (e.g., devices 1-3), whereas a second device usage profile associated with those ages 21-50 may be assigned to the second group of three devices (e.g., devices 4-6). The device usage profiles may be determined by feedback from actual users (e.g., survey responses), usage of actual users (e.g., monitored and stored using monitor 440a-440c), adjusted simulation parameters corresponding to a given device usage profile (e.g., after one or more simulations with actual device usage information from devices 160-160c), third-party usage information, estimation based upon known characteristics for a given cross-section of society, etc.

As shown in FIG. 7, step 750 involves generating information about portable device advertising for the population based upon the device usage profile assigned to each device/emulator grouping. In one embodiment, where each device usage profile assigned to the respective groupings is comprised of device usage characteristics for which a simulation parameter may be determined, process 500 of FIGS. 5A and 5B may be used to generate the information about advertising on portable devices. For example, where four device usage profiles are assigned to the 10 devices/emulators (e.g., one device usage profile for each grouping), then process 500 may be repeated once for each device usage profile.

Figure 8:
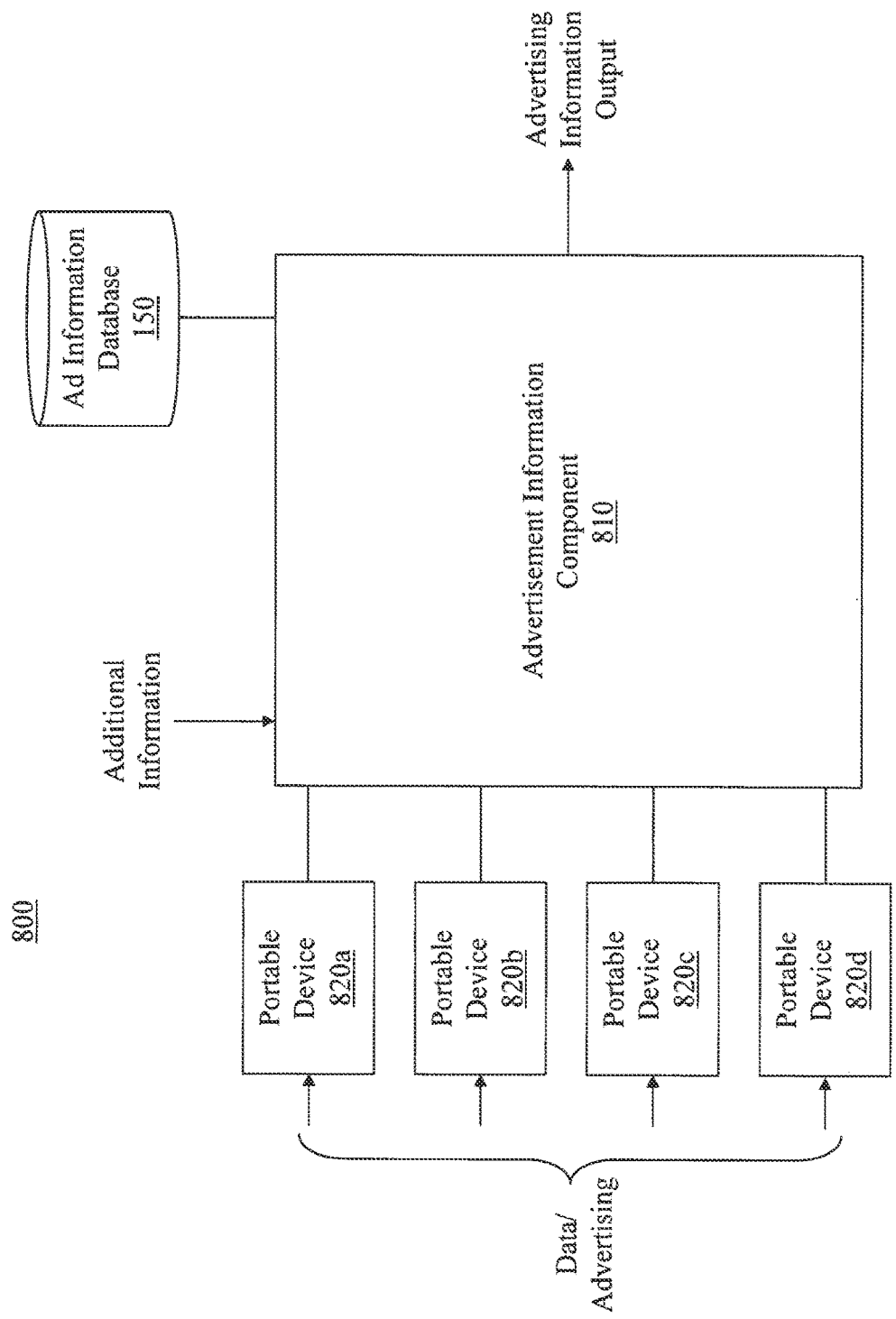
FIG. 8 shows a first exemplary system for generating information about portable device advertising using actual portable device usage in accordance with one embodiment of the present invention.

Using Actual Portable Device Usage to Generate Information about Portable Device Advertising FIG. 8 shows first exemplary system 800 for generating information about portable device advertising using actual portable device usage in accordance with one embodiment of the present invention. As shown in FIG. 8, advertisement information component 810 is coupled to a plurality of actual portable devices 820a-820d, where each device is operated by an actual user (e.g., similar to devices 160a-160c of FIG. 1). Devices 820a-820d are operable to monitor, optionally store, and communicate to component 810 usage information for each device. Additionally, each device is operable to monitor received data comprising advertisements and distinguish advertising content from non-advertising content (e.g., as discussed with respect to devices 120a-120b of FIG. 1 and device/emulator 430a/430b of FIG. 4), where information about the advertising content may be communicated to component 810. Component 810 may then determine at least one attribute of the distinguished advertisements (e.g., as discussed with respect to component 110 of FIG. 1 and component 420 of FIG. 4) if not already performed by devices 820a-820d. Component 810 may further process the advertisement information before outputting it, or alternatively, may output the advertisement information without processing (e.g., as discussed with respect to component 110 of FIG. 1 and component 420 of FIG. 4). Additionally, the advertising information may be stored (e.g., in database 150) as discussed above with respect to prior Figures. Accordingly, embodiments provide efficient and cost-effective mechanisms for generating information about advertising on portable devices which reduce reliance upon user responses and feedback, thereby providing more accurate and complete information.

Devices 820a-820d may comprise mobile telephones, portable gaming devices, video game consoles, portable media devices, portable digital assistants (PDAs), handheld computer systems, etc. Each device may receive data comprising advertisements over one or more wired and/or wireless networks utilizing various signaling techniques and/or protocols (e.g., TCP/IP, Bluetooth, IEEE 802.11a, IEEE 802.11b, IEEE 802.11g, CDMA, WCDMA, TDMA, 3G, LMDS, MMDS, etc.). Additionally, devices 820a-820d may communicate advertisement information to component 810 (e.g., with or without encoding, encryption, etc.) over one or more wired and/or wireless networks. In one embodiment, devices 820a-820d may receive data comprising advertisements over the same network or networks used to communicate with component 810.

Additionally, in one embodiment, the monitoring, distinguishing and communication of advertising information may be with the permission of the user (e.g., as part of an "opt-in" agreement) and may optionally comprise various security measures (e.g., encoding, encryption, etc.) to increase the security of the information monitored, distinguished and communicated.

Devices 820a-820d may access many types of content which contain advertising material. For example, mobile television broadcasts may comprise advertisements similar to television commercials. Downloadable content (e.g., videos, music, etc.) may be bundled with advertisements. Similarly, streaming content may comprise advertisements as part of the stream initialization, interspersed within the stream, etc. Further, advertisements may be placed within applications used for web browsing (e.g., banners, pop-up windows, etc.), games (e.g., as product placements accessed during game play, bundled with the game, etc.), etc. And in other embodiments, other types of data may be accessed which comprises advertisements.

In contrast to the simulated usage described above with respect to prior Figures, user inputs to devices 820a-820d control which type of data is accessed and how each type of data is accessed. For example, a user (e.g., via a user input to a respective device) may not only switch between different types of content, but may also control the duration of each access, the time of each access, characteristics of each access (e.g., mobile TV channel, website, specific game or game genre, etc.), etc. Additionally, a user may alter the location of the data accesses, where the location may represent a physical location (e.g., nation, state, city, street, coordinate, etc.) of the device controlled by the user, of the user, etc. The location may be altered by manually varying an input (e.g., inputting a location identifier), or alternatively, by moving to a different physical location and using the device from that location (e.g., either in the presence of the device or remotely).

It should be appreciated that the advertising content accessed by a portable device may vary considerably among the different advertising medium providing access to different data types. Further, it should be appreciated that the advertising content accessed via the same advertising medium (e.g., comprising the same data type) may vary considerably when accessed at different times, locations, with different access characteristics, etc. As such, embodiments may provide accurate, complete and representative information about portable device advertising by seeking a panel of participating devices (e.g., 820a-820d) with varied personal characteristics, device usage profiles, etc. Additionally, in one embodiment, the portable device advertising information from the panel of actual devices (e.g., 820a-820d) may be supplemented, combined, etc. with portable device advertising information from simulated portable devices (e.g., obtained, processed, etc. as discussed above with respect to prior Figures).

Given that the information about portable device advertising is provided by actual usage of the portable devices (e.g., 820a-820d), system 800 may apply information collected from the users of the portable devices (e.g., 820a-820d) to the advertising information (e.g., advertisement attributes, device usage information associated with the advertisement attributes, etc.). The additional information may be collected from the users (e.g., using a survey during sign-up, etc.) agreeing to participate in the monitoring, distinguishing and communicating of advertisement information. Additionally, the information may comprise more detailed personal information about participant users (e.g., income, eating habits, pets, etc.), which may in turn increase the relevance (e.g., to certain types of users, markets, etc.) and utility (e.g., enabling the indexing, sorting, etc. of the adverting information based upon the personal information) of such information.

Although FIG. 8 depicts four devices (e.g., 820a-820d) coupled to component 810, it should be appreciated that a larger or smaller number of devices may be coupled in other embodiments. Accordingly, embodiments provide scalability (e.g., by adding additional devices to the panel), where the scalability enables the collection of more advertisement information for more complete and representative information. Additionally, although component 810 is depicted in FIG. 8 as a single component, it should be appreciated that component 810 may be partitioned into multiple components in other embodiments. Further, although component 810 is depicted in FIG. 8 as distinct from devices 820a-820d, it should be appreciated that component 810 may be located (e.g., in whole, in part, etc.) in one or more of the devices in other embodiments.

Figure 9:
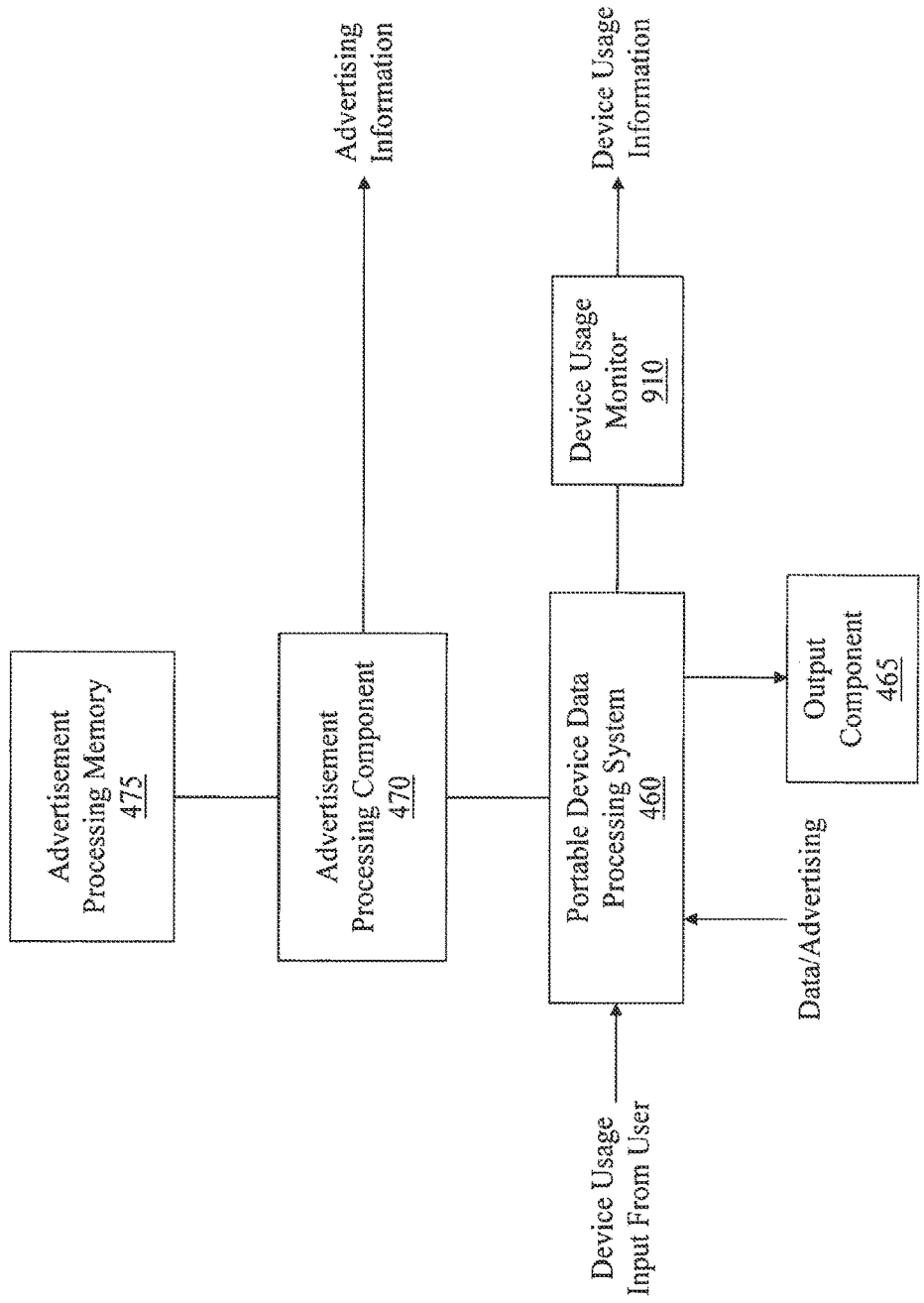
FIG. 9 shows an exemplary portable device in accordance with one embodiment of the present invention.

FIG. 9 shows exemplary portable device 820 in accordance with one embodiment of the present invention. As shown in FIG. 9, device 820 may be used with system 800 to implement any of portable devices 820a-820d in one embodiment.

Portable device data processing system 460 is operable to receive data comprising advertising content (e.g., Internet data, mobile TV data, etc.), where the data may be processed and/or output via output component 465. As discussed above with respect to FIG. 8, a user input may be used to control access to data comprising advertisements. Such a user input may comprise a device usage input from a user to system 460, where the device user input may control and/or adjust the state of system 460 (e.g., to change a channel of a mobile TV presentation, access different websites via the Internet, etc.).

As shown in FIG. 9, device usage of device 820 may be monitored by device usage monitor 910. In one embodiment, monitor 910 may operate similarly to monitors 440a-440c of FIG. 4. As such, after monitoring usage of device 820, monitor 910 may store (e.g., in a coupled memory of device 820, which is not shown in FIG. 9) and/or communicate the usage information to a coupled component (e.g., 810) for further processing. Additionally, in one embodiment, the information stored and/or communicated may comprise that associated with distinguished advertisements (e.g., distinguished or otherwise accessed by component 470).

Advertisement processing component 470 is coupled to system 460 for accessing the data comprising advertisements and for distinguishing advertising content from non-advertising content (e.g., as discussed with respect to devices 820a-820d of FIG. 8, device 820 of FIG. 9, etc.). Advertisement processing memory 475 may be used to store information about known advertisements to enable component 470 to distinguish advertising material from non-advertising material. In one embodiment, once component 470 has distinguished an advertisement, it may communicate information about the advertising content (e.g., one or more pixels, one or more frames, other data, encoded information, etc.) to a coupled component (e.g., 810) for subsequent determination of advertisement attributes (e.g., 310) and/or processing as discussed above. The information about the advertising content may be stored in memory 475 for subsequent access, modification, etc. In another embodiment, component 470 may distinguish advertising material as well as determine advertisement attributes (e.g., 310). As such, memory 475 may be used to store information about the advertising content and/or information about the determined attributes (e.g., 310). Component 470 may transmit the determined advertisement attributes to a coupled component (e.g., 810) for further processing as discussed above.

Figure 10A:
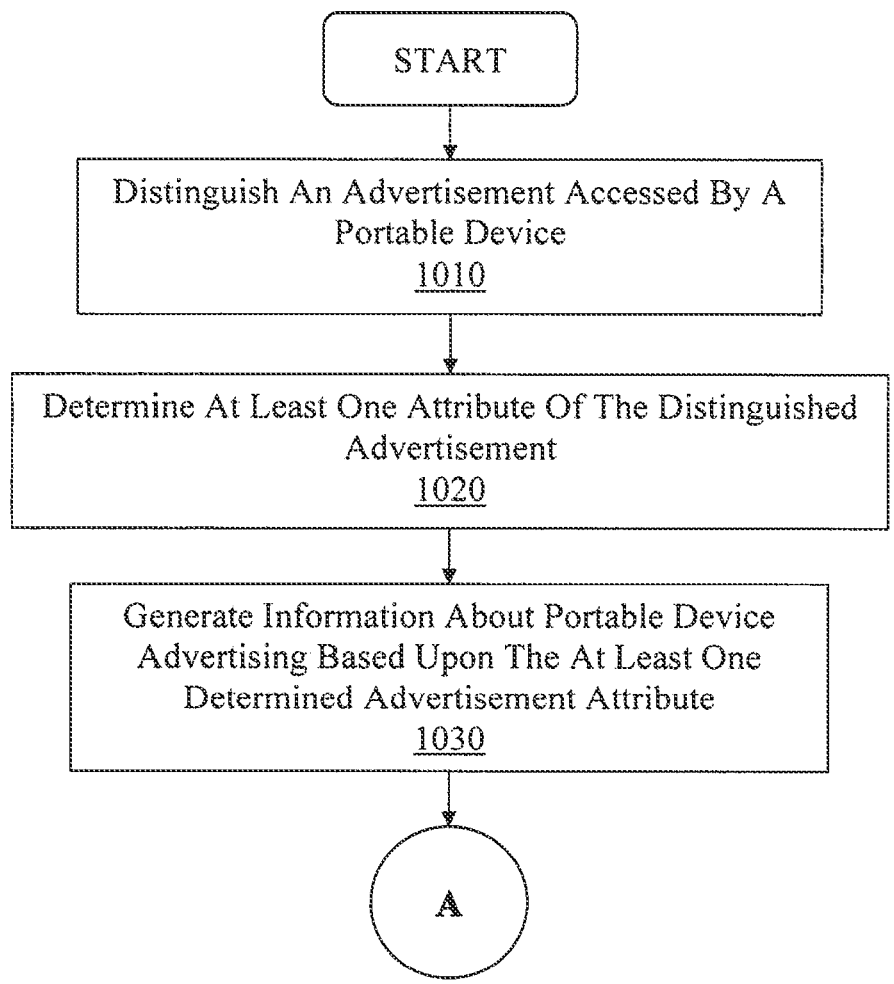
FIG. 10A shows a first portion of a computer-implemented process for generating information about advertising on portable devices using actual portable device usage in accordance with one embodiment of the present invention.
Figure 10B:
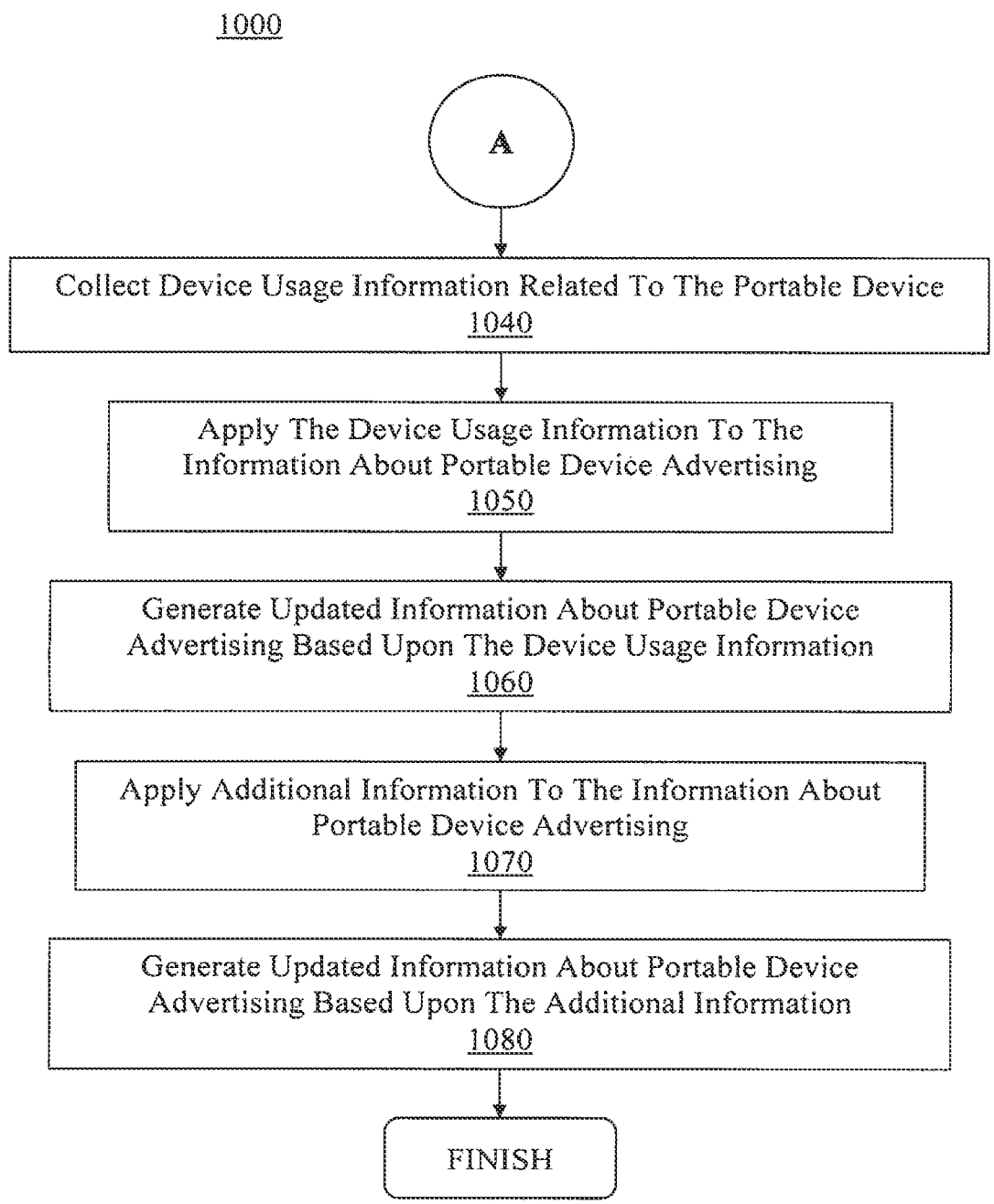
FIG. 10B shows a second portion of a computer-implemented process for generating information about advertising on portable devices using actual portable device usage in accordance with one embodiment of the present invention.

FIGS. 10A and 10B show computer-implemented process 1000 for generating information about advertising on portable devices using actual portable device usage in accordance with one embodiment of the present invention. As shown in FIG. 10A, step 1010 involves distinguishing an advertisement accessed by a portable device. The advertisement may be accessed in response to a user input to the portable device (e.g., 820a-820d of FIG. 8, 820 of FIG. 9, etc.). Additionally, the advertisement may be distinguished from non-advertising content by, for example, comparing one or more pixels of potential advertisements with one or more pixels of known advertisements. Alternatively, one or more frames of potential advertisements may be compared with one or more frames of known advertisements. And in another embodiment, encoded information indicating an advertisement may be read from the data comprising potential advertisements to distinguish an advertisement.

Step 1020 involves determining at least one attribute of the distinguished advertisement. Advertisement attributes (e.g., 310) may comprise, for example, a portable device and/or emulated portable device presenting the advertisement, a unique identifier of the advertisement, a genre of the advertisement, a product and/or service associated with the advertisement, a time and/or location of the presentation of the advertisement, an advertising medium associated with the advertisement, etc. In one embodiment, such a determination may be made by accessing a database or memory (e.g., 475) comprising advertisement attributes for known advertisements, where the database may be indexed based upon at least one known attribute of the advertisement (e.g., advertisement identifier, etc.).

As shown in FIG. 10A, step 1030 involves generating information about portable device advertising based upon at least one of the determined advertisement attributes. The information may be generated by processing the advertisement attributes (e.g., sorting, filtering, cleaning, performing trending to show differences in the information overtime, preparing the information for output, etc.).

Step 1040 involves collecting device usage information related to the portable device. The device usage information (e.g., 200) may be related to usage of the device (e.g., 820a-820d of FIG. 8, 820 of FIG. 9, etc.) by a user. Additionally, the device usage information (e.g., 200) may relate to the at least one advertisement distinguished in step 1020, where the device usage information may comprise an identifier for the device accessing the advertisement (e.g., represented in column 210 of FIG. 2), a type of device usage resulting in the access of the advertisement (e.g., represented in column 220 of FIG. 2), a device usage quantity during which the advertisement was accessed (e.g., represented in column 230 of FIG. 2), a time at which the advertisement was accessed (e.g., represented in column 240 of FIG. 2), a location at which the advertisement was accessed (e.g., represented in column 250 of FIG. 2), etc. Additionally, the device usage information may be collected by a device usage monitor (e.g., 910) of the device (e.g., 820a-820d of FIG. 8, 820 of FIG. 9, etc.).

As shown in FIG. 10B, step 1050 involves applying device usage information (e.g., 200) to the information about portable device advertising (e.g., 310) generated in step 1030. In one embodiment, applying the device usage information to the portable device advertising may result in advertising information as represented by information 300 of FIG. 3.

Step 1060 involves generating updated information about portable device advertising based upon the device usage information. The information may be generated by processing the advertisement attributes and the device usage information (e.g., sorting, filtering, cleaning, performing trending to show differences in the information over time, preparing the information for output, etc.).

As shown in FIG. 10B, step 1070 involves applying additional information to the information about portable device advertising (e.g., 310) generated in step 1030. The additional information may comprise census data, demographical data, third-party data, data from survey responses (e.g., of a user of the device distinguishing the advertisement in step 1010), etc. Additionally, the additional data applied to the information about portable device advertising may relate to a device usage characteristic and/or an advertisement attribute.

Step 1080 involves generating updated information about portable device advertising based upon the additional information. The information may be generated by processing the advertisement attributes and the additional information (e.g., sorting, filtering, cleaning, performing trending to show differences in the information over time, preparing the information for output, etc.).

Computer System Platform

Figure 11:
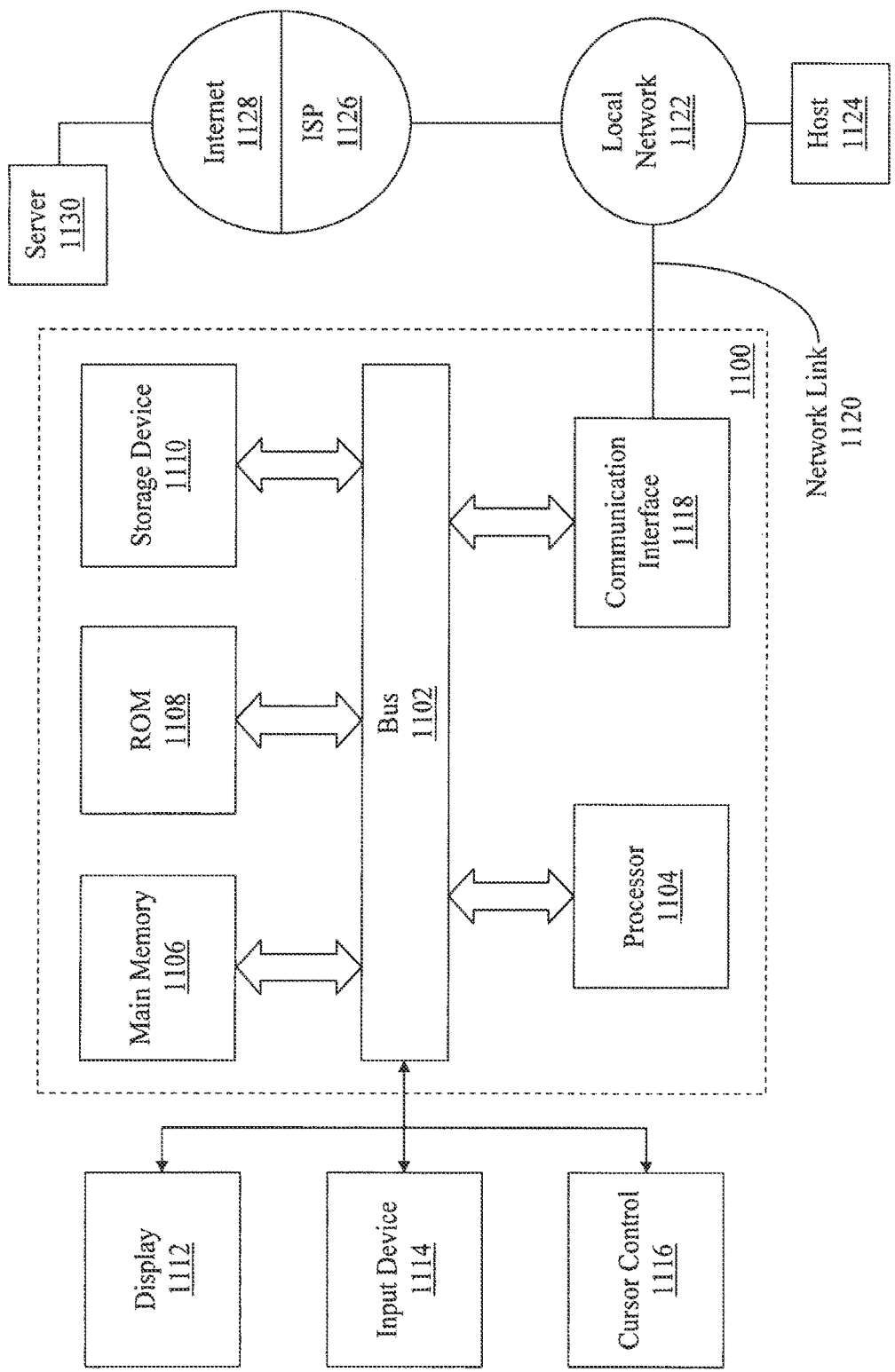
FIG. 11 shows an exemplary computer system upon which embodiments of the present invention may be implemented.

FIG. 11 shows exemplary computer system 1100 upon which embodiments of the present invention may be implemented. With reference to FIG. 11, portions of the present invention are comprised of computer-readable and computer-executable instructions that reside, for example, in computer system 1100 which may be used as a part of a general purpose computer network (not shown). It is appreciated that computer system 1100 of FIG. 11 is merely exemplary. As such, the present invention can operate within a number of different computer systems including general-purpose computer systems, embedded computer systems, laptop computer systems, hand-held computer systems, portable computer systems (e.g., portable devices), and stand-alone computer systems.

In the present embodiment, computer system 1100 includes an address/data bus 1102 for conveying digital information between the various components, a central processor unit (CPU) 1104 coupled to bus 1102 for processing the digital information and instructions, a volatile main memory 1106 coupled to bus 1102 comprised of volatile random access memory (RAM) for storing the digital information and instructions, and a non-volatile read only memory (ROM) 1108 coupled to bus 1102 for storing information and instructions of a more permanent nature. In addition, computer system 1100 may also include a data storage device 1110 (e.g., a magnetic, optical, floppy, tape, or other drive) coupled to bus 1102 for storing larger amounts of data. It should be noted that the software program for performing the method of generating information about portable device advertising of the present invention may be stored in main memory 1106, ROM 1108, storage device 1110, registers within CPU 1104 (not shown), and/or in an external storage device (not shown).

As shown in FIG. 11, computer system 1100 may be coupled via bus 1102 to an optional display device 1112 (e.g., a CRT monitor, LCD monitor, etc.) for displaying information received from computer system 1100. An optional input device 1114 (e.g., an alphanumeric keyboard) may also be coupled to computer system 1100 via bus 1102 for communicating information and command selections to CPU 1104. Cursor control device 1116 (e.g., a mouse, trackball, light pen, etc.) may also be coupled to computer system 1100 via bus 1102 for communicating direction information and command selections to CPU 1104 and for controlling cursor movement (e.g., on display 1112). Additionally, computer system 1100 can include a mechanism for emitting an audible signal (not shown).

Computer system 1100 may also include a communication interface 1118 coupled to bus 1102. Communication interface 1118 provides a two-way data communication coupling to local network 1122 via network link 1120. For example, communication interface 1118 may be an integrated services digital network (ISDN) device or modem to provide a data communication connection to a corresponding type of telephone line. As another example, communication interface 1118 may be a local area network (LAN) device to provide a data communication connection to a compatible LAN. And as yet another example, network link 1120 may comprise a wireless connection between communication interface 1118 and local network 1122. Regardless of the implementation utilized, communication interface 1118 may send and receive electrical, electromagnetic, and/or optical signals that carry digital data streams representing various types of information.

As shown in FIG. 11, network link 1120 may provide data communication through one or more networks to other data devices. For example, network link 1120 may provide a connection through local network 1122 to a host computer 1124 or to data equipment operated by internet service provider (ISP) 1126. ISP 1126 in turn provides data communication services through the worldwide packet data communication network, now commonly referred to as the "Internet" 1128. Local network 1122 and Internet 1128 may use electrical, electromagnetic, and/or optical signals to convey digital data streams. The signals through the various networks and network link 1120, which carry digital data to and from computer system 1100, are exemplary forms of carrier waves transporting information.

Accordingly, computer system 1100 can send and receive messages through networks(s), network link 1120, and communication interface 1118. For example, server 1130 may transmit a requested code for an application program through Internet 1128, ISP 1126, local network 1122, and communication interface 1118. The received code may be executed by CPU 1104 upon receipt, and/or be stored in one of the coupled memory devices (e.g., storage device 1110, ROM 1108, RAM 1106, etc.) for later execution.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computing system comprising:
    a processor; and
    a non-transitory computer-readable storage medium, having stored thereon program instructions that, upon execution by the processor, cause performance of a set of operations comprising:
        causing a first client device to access first data via the Internet based on a first usage profile, wherein the first usage profile is representative of first client device usage by a first portion of a population, and wherein the first data comprises first advertising content and first non-advertising content;
        causing a second client device to access second data via the Internet based on a second usage profile, wherein the second usage profile is representative of second client device usage by a second portion of the population, and wherein the second data comprises second advertising content and second non-advertising content;
        identifying, from the first data, the first advertising content;
        identifying, from the second data, the second advertising content;
        generating first client device advertising information corresponding to the first portion of the population and the first advertising content accessed by the first client device; and
        generating second client device advertising information corresponding to the second portion of the population and the second advertising content accessed by the second client device.

2. The computing system of claim 1, wherein the set of operations further comprising:
    identifying at least one characteristic by which to group the population; and
    dividing the population into the first portion and the second portion based on the at least one characteristic.

3. The computing system of claim 1, wherein the set of operations further comprise forming a first group of client devices to simulate the first client device usage by the first portion of the population, and wherein the first group of the client devices comprises the first client device.

4. The computing system of claim 1, wherein the set of operations further comprise identifying a first attribute of the first advertising content, and wherein the first attribute corresponds to at least one of a product, a service, or a genre.

5. The computing system of claim 1, the set of operations further comprising:
   accessing, from the first usage profile, at least one of a first location or a first time corresponding to the first client device usage; and
   causing the first client device to access the first data based on the at least one of the first location or the first time.

6. The computing system of claim 1,
   wherein the set of operations further comprise controlling the first client device to access the first data via the Internet based on a first type of usage of the first client device represented in the first usage profile; and
   wherein the first type of usage of the first client device comprises at least one of Internet-related usage, television-related usage, gaming-related usage, download-related usage, media playback related usage, or messaging-related usage.

7. A non-transitory computer-readable storage medium, having stored thereon program instructions that, upon execution by a processor, cause performance of a set of operations comprising:
   causing a first client device to access first data via the Internet based on a first usage profile, wherein the first usage profile is representative of first client device usage by a first portion of a population, and wherein the first data comprises first advertising content and first non-advertising content;
   causing a second client device to access second data via the Internet based on a second usage profile, wherein the second usage profile is representative of second client device usage by a second portion of the population, and wherein the second data comprises second advertising content and second non-advertising content;
   identifying, from the first data, the first advertising content;
   identifying, from the second data, the second advertising content;
   generating first client device advertising information corresponding to the first portion of the population and the first advertising content accessed by the first client device; and
   generating second client device advertising information corresponding to the second portion of the population and the second advertising content accessed by the second client device.

8. The non-transitory computer-readable storage medium of claim 7, set of operations further comprising:
   identifying at least one characteristic by which to group the population; and
   dividing the population into the first portion and the second portion based on the at least one characteristic.

9. The non-transitory computer-readable storage medium of claim 7, wherein the set of operations further comprise forming a first group of client devices to simulate the first client device usage by the first portion of the population, and wherein the first group of the client devices comprises the first client device.

10. The non-transitory computer-readable storage medium of claim 7, wherein the set of operations further comprise identifying a first attribute of the first advertising content, the first attribute corresponding to at least one of a product, a service, or a genre.

11. The non-transitory computer-readable storage medium of claim 7, the set of operations further comprising:
    accessing, from the first usage profile, at least one of a first location or a first time corresponding to the first client device usage; and
    causing the first client device to access the first data based on the at least one of the first location or the first time.

12. The non-transitory computer-readable storage medium of claim 7, wherein the set of operations further comprise controlling the first client device to access the first data via the Internet based on a first type of usage of the first client device represented in the first usage profile, and wherein the first type of usage of the first client device comprises at least one of Internet-related usage, television-related usage, gaming-related usage, download-related usage, media playback related usage, or messaging-related usage.

13. A method comprising:
    causing a first client device to access first data via the Internet based on a first usage profile, wherein the first usage profile is representative of first client device usage by a first portion of a population, and wherein the first data comprises first advertising content and first non-advertising content;
    causing a second client device to access second data via the Internet based on a second usage profile, wherein the second usage profile is representative of second client device usage by a second portion of the population, and wherein the second data comprises second advertising content and second non-advertising content;
    identifying, from the first data, the first advertising content;
    identifying, from the second data, the second advertising content;
    generating first client device advertising information corresponding to the first portion of the population and the first advertising content accessed by the first client device; and
    generating second client device advertising information corresponding to the second portion of the population and the second advertising content accessed by the second client device.

14. The method of claim 13, further comprising:
    dividing the population into the first portion and the second portion based on at least one characteristic by which the population is to be grouped.

15. The method of claim 13, further comprising:
    forming a first group of client devices to simulate the first client device usage by the first portion of the population, the first group of the client devices including the first client device.

16. The method of claim 13, further comprising:
    identifying a first attribute of the first advertising content, the first attribute corresponding to at least one of a product, a service, or a genre.

17. The method of claim 13, further comprising:
    accessing, from the first usage profile, at least one of a first location or a first time corresponding to the first client device usage; and
    causing the first client device to access the first data based on the at least one of the first location or the first time.

18. The method of claim 13, further causing:
    controlling the first client device to access the first data via the Internet based on a first type of usage of the first client device represented in the first usage profile, wherein the first type of usage of the first client device comprises at least one of Internet-related usage, television-related usage, gaming-related usage, download-related usage, media playback related usage, or messaging-related usage.

19. The computing system of claim 1, wherein the identifying the first advertising content comprises comparing pixels of the first data to pixels of known advertisements to identify the first advertising content.

20. The computing system of claim 1, wherein the identifying the first advertising content comprises comparing one or more frames of the first data to one or more frames of known advertisements to identify the first advertising content.

21. The computing system of claim 1, wherein the first advertising content comprises a first advertisement; and wherein the identifying the first advertising content comprises comparing the first advertisement to one or more advertisements stored in a database.

* * * * *